US010939340B2

(12) United States Patent
Lyu et al.

(10) Patent No.: US 10,939,340 B2
(45) Date of Patent: Mar. 2, 2021

(54) ROLE CHANGE BETWEEN ACCESS POINTS DURING DOWNLINK CONTROL-BASED HANDOVER

(71) Applicants: Yongxia Lyu, Ottawa (CA); Jialin Zou, Randolph, NJ (US); Jianglei Ma, Ottawa (CA); Usa Vilaipornsawai, Ottawa (CA)

(72) Inventors: Yongxia Lyu, Ottawa (CA); Jialin Zou, Randolph, NJ (US); Jianglei Ma, Ottawa (CA); Usa Vilaipornsawai, Ottawa (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 16/532,991

(22) Filed: Aug. 6, 2019

(65) Prior Publication Data
US 2020/0053610 A1 Feb. 13, 2020

Related U.S. Application Data

(60) Provisional application No. 62/716,731, filed on Aug. 9, 2018.

(51) Int. Cl.
*H04W 36/00* (2009.01)
*H04W 36/08* (2009.01)
(Continued)

(52) U.S. Cl.
CPC ..... *H04W 36/00837* (2018.08); *H04L 1/0004* (2013.01); *H04L 1/0061* (2013.01);
(Continued)

(58) Field of Classification Search
CPC .......... H04W 36/00837; H04W 36/08; H04W 72/042; H04W 36/0027; H04W 36/0016;
(Continued)

(56) References Cited

U.S. PATENT DOCUMENTS 10,448,289 B2 * 10/2019 Tenny ............... H04W 36/0038
2014/0334392 A1 * 11/2014 Gage ..................... H04L 5/0092
370/329

(Continued)

FOREIGN PATENT DOCUMENTS

CN 104349505 A 2/2015
CN 107306455 A 10/2017
(Continued)

OTHER PUBLICATIONS

Nokia Networks et al. Dual Connectivity Corrections, R2-151685, 3GPP TSG-RAN WG2 Meeting #89bis, Apr. 24, 2015, total 26 pages.
(Continued)

*Primary Examiner* — Kibrom T Hailu

(57) ABSTRACT

Methods and devices for performing role change are described. Dynamic signaling is used. Example formats for uplink and downlink signaling is also described. In some examples, an electronic device (ED) receives, via dynamic signaling, from a first serving cell, with which the ED initially has a primary connection, a role change trigger. The role change trigger causes the ED to use a connection with a second serving cell, with which the ED initially has a secondary connection, as the primary connection instead of the first serving cell.

19 Claims, 18 Drawing Sheets

(51) Int. Cl.
  *H04L 1/00*   (2006.01)
  *H04L 1/18*   (2006.01)
  *H04W 72/04*  (2009.01)

(52) U.S. Cl.
  CPC .......... *H04L 1/1819* (2013.01); *H04W 36/08*
      (2013.01); *H04W 72/042* (2013.01)

(58) Field of Classification Search
  CPC ............ H04W 36/0069; H04L 1/0061; H04L
          1/1819; H04L 1/0004; H04L 63/0428
  See application file for complete search history.

(56) References Cited

U.S. PATENT DOCUMENTS

| | | | |
|---|---|---|---|
| 2015/0045052 A1 | 2/2015 | Pao et al. | |
| 2016/0338134 A1* | 11/2016 | Nagasaka | H04W 36/08 |
| 2017/0142738 A1* | 5/2017 | You | H04L 5/005 |
| 2018/0332657 A1* | 11/2018 | Fan | H04W 36/38 |
| 2018/0338271 A1* | 11/2018 | Park | H04W 74/0833 |
| 2020/0022043 A1* | 1/2020 | Pelletier | H04W 74/0833 |
| 2020/0107189 A1* | 4/2020 | Sharma | H04W 36/0038 |

FOREIGN PATENT DOCUMENTS

| | | |
|---|---|---|
| EP | 3448113 A1 | 2/2019 |
| WO | 2015140006 A1 | 9/2015 |

OTHER PUBLICATIONS

Zte et al. Consideration on the configuration of cell group (RILNo Z081), R2-1800406, 3GPP TSG RAN WG2 NR Ad hoc 0118, Jan. 26, 2018, total 4 pages.

* cited by examiner

| DCI field | Header 605 | Frequency domain resource allocation 610 | Time domain resource allocation 615 | VRB-PRB mapping 620 | HARQ process 625 | MCS 630 | NDI 635 | RV 640 | DAI 645 | TPC 650 | PUCCH resource 655 | HARQ TIMG 660 | CRC 665 |
|---|---|---|---|---|---|---|---|---|---|---|---|---|---|
| Value set as predefined | 1 | Set to all '1's | Set to all '1's | Set to 0 OR Set to 1 | Set to all '0's | Set to all '1's | Set to 0 | Set to '00' | set to '00' OR Reserved | -- | -- | -- | 24 |

FIG. 6A

```
SEQUENCE {
    SRS-ResourceId,
    ENUMERATED {port1, ports2, ports4},
    ENUMERATED {n0, n1}                    -- Need R
        OPTIONAL,
    CHOICE {
        SEQUENCE {
            INTEGER (0..1),
            INTEGER (0..7)
        },
        SEQUENCE {
            INTEGER (0..3),
            INTEGER (0..11)
        }
    },
    SEQUENCE {
        INTEGER (0..5),
        ENUMERATED {n1, n2, n4},
        ENUMERATED {n1, n2, n4}
    }
```

```
SRS-Resource ::=
    srs-ResourceId
    nrofSRS-Ports
    ptrs-PortIndex
    transmissionComb
        n2
            combOffset-n2
            cyclicShift-n2
        },
        n4
            combOffset-n4
            cyclicShift-n4
        }
    },
    resourceMapping
        startPosition
        nrofSymbols
        repetitionFactor
    },
```

FIG. 6B

ROLE CHANGE BETWEEN ACCESS POINTS DURING DOWNLINK CONTROL-BASED HANDOVER

CROSS-REFERENCE TO RELATED APPLICATIONS

The present disclosure claims priority from U.S. provisional patent application No. 62/716,731, entitled "ROLE CHANGE BETWEEN ACCESS POINTS DURING DOWNLINK CONTROL-BASED HANDOVER", filed Aug. 9, 2018, the entirety of which is hereby incorporated by reference.

FIELD

The present disclosure is related to methods and systems for facilitating a role change between access points, during a handover.

BACKGROUND

In mobile networks, such as in Fourth Generation (4G), Fifth Generation (5G) and Long-Term Evolution (LTE) networks, an electronic device (e.g., a user equipment (UE)) may access a core network via a base station. A base station has a certain coverage area. When an ED moves through the topology of the network, it may be necessary to perform handover procedures between base stations to ensure that the ED remains seamlessly connected to the core network, as the ED moves between areas covered by different base stations. Part of the handover procedure, such as when using dual connectivity (DC), is a role change between a source base station and a target base station. Specifically, the source base station, which initially provides a primary connection with the ED, and the target base station, which is the target of the handover, must switch roles.

In ultra-reliable low latency communication (URLLC), there are requirements for reliability and low latency. However, current techniques for the role change procedure may have latency on the order of 10 ms to a few hundred ms, which may not satisfy low latency requirements for URLLC. Further, current handover techniques may introduce large overhead in radio resources.

Accordingly, it would be desirable to provide a way to facilitate role change and handover between base stations, including for DC-based handover procedures, with less latency.

SUMMARY

In various examples described herein, dynamic signaling (e.g., over the physical layer) is used to facilitate role change between a source base station and a target base station. Examples described herein may enable handover procedures with lower latency, and may be suitable for URLLC.

In some aspects, the present disclosure describes an electronic device (ED). The ED includes a processing unit configured to execute instructions to cause the ED to: receive, via dynamic signaling, from a first serving cell, with which the ED initially has a primary connection, a role change trigger; wherein the role change trigger causes the ED to use a connection with a second serving cell, with which the ED initially has a secondary connection, as the primary connection instead of the first serving cell.

In some examples, the instructions may further cause the ED to: transmit, to at least one of the first serving cell and the second serving cell, an acknowledgement of the role change trigger, via dynamic signaling.

In any of the examples, the ED may be in connection with the first serving cell and also may be in connection with the second serving cell. The first serving cell may be a cell of a master cell group for the ED and the second serving cell may be a cell of a secondary cell group for the ED. The instructions may further cause the ED to reconfigure connection information by switching configuration information between the cell of the master cell group and the cell of the secondary cell group In any of the examples, the role change trigger may be received as a downlink control information (DCI) signal In any of the examples, the DCI signal may include at least two fields containing all '0' or all '1', the at least two fields may be at least two of: a hybrid automatic repeat request (HARQ) process field, a modulation and coding scheme (MCS) field, a new data indicator (NDI) field, or a redundancy version field. The instructions may further cause the ED to recognize the two fields containing all '0' or all '1' as indicating the role change trigger.

In any of the examples, the DCI signal may include at least one field having no predetermined value, the at least one field may be at least one of: a transmit power control (TPC) field, a physical uplink control channel (PUCCH) resource field, or a hybrid automatic repeat request (HARQ) timing field.

In any of the examples, the at least one field having no predetermined value may contain information useable by the ED to provide feedback.

In any of the examples, cyclic redundancy check (CRC) bits of the DCI signal may have been scrambled using a specific identifier.

In any of the examples, the specific identifier may be a specific radio network temporary identifier (RNTI).

In any of the examples, the role change trigger may include information identifying the second serving cell as a target for the role change.

In any of the examples, the instructions may further cause the ED to: receive configuration information from the second serving cell; and reconfigure connection information using the received configuration information.

In some aspects, the present disclosure describes a method at an electronic device (ED). The method includes: receiving, via dynamic signaling, from a first serving cell, with which the ED initially has a primary connection, a role change trigger; wherein the role change trigger causes the ED to use a connection with a second serving cell, with which the ED initially has a secondary connection, as the primary connection instead of the first serving cell.

In any of the examples, the method may further include: transmitting, to at least one of the first serving cell and the second serving cell, an acknowledgement of the role change trigger, via dynamic signaling.

In some aspects, the present disclosure describes a base station. The base station includes a processing unit configured to execute instructions to cause the base station to: determine a role change is required; and transmit a role change trigger to an electronic device (ED) connected to a serving cell of the base station, via dynamic signaling.

In any of the examples, the instructions may further cause the base station to: receive an acknowledgement of the role change trigger from the ED, via dynamic signaling.

In any of the examples, the instructions may further cause the base station to, prior to transmitting the role change trigger: transmit a role change request to a serving cell of a second base station that is a target of the role change; and receive a role change response from the second base station.

In any of the examples, the serving cell of the base station may be initially in the role of a cell of a master cell group.

In any of the examples, the role change trigger may include information identifying a serving cell of a second base station as a target for the role change.

In any of the examples, the role change trigger may be transmitted as a downlink control information (DCI) signal.

In any of the examples, the DCI signal may include at least two fields containing all '0' or all '1', the at least two fields may be at least two of: a hybrid automatic repeat request (HARQ) process field, a modulation and coding scheme (MCS) field, a new data indicator (NDI) field, or a redundancy version field. The two fields containing all '0' or all '1' may indicate the role change trigger.

In any of the examples, the DCI signal may include at least one field having no predetermined value, the at least one field may be at least one of: a transmit power control (TPC) field, a physical uplink control channel (PUCCH) resource field, or a hybrid automatic repeat request (HARQ) timing field. The at least one field having no predetermined value may contain a bit value for indicating a target of the role change.

In any of the examples, cyclic redundancy check (CRC) bits of the DCI signal may have been scrambled using a specific radio network temporary identifier (RNTI).

In any of the examples, the role change trigger may be transmitted to a group of EDs.

BRIEF DESCRIPTION OF THE DRAWINGS

Reference will now be made, by way of example, to the accompanying drawings which show example embodiments of the present application, and in which:

FIG. 6A is a table illustrating an example DCI format in accordance with example embodiments of the present disclosure;

FIG. 6B shows existing parameters for a SRS resource set configuration message;

Similar reference numerals may have been used in different figures to denote similar components.

DESCRIPTION OF EXAMPLE EMBODIMENTS

Examples described herein may help to reduce latency and/or improve performance compared to conventional techniques for role switching in handover procedures. Examples described herein may be suitable for implementation in or be compatible with 5th Generation (5G) wireless communication technology, including ultra-reliable low latency communications (URLLC).

In 5G New Radio (NR), different devices and services are expected to have different requirements for wireless communication. For example, some devices may require low-latency communication (e.g., less than 0.5 ms round trip) with high reliability (e.g., less than $10^{-5}$ block error rate (BLER)). These devices are proposed to communicate in a framework sometimes known as URLLC. URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

To satisfy the requirements latency and reliability requirements of URLLC communication, a number of features are proposed that differ from conventional Long Term Evolution (LTE) communication and from NR enhanced mobile broadband (eMBB) communication.

Figure 1:
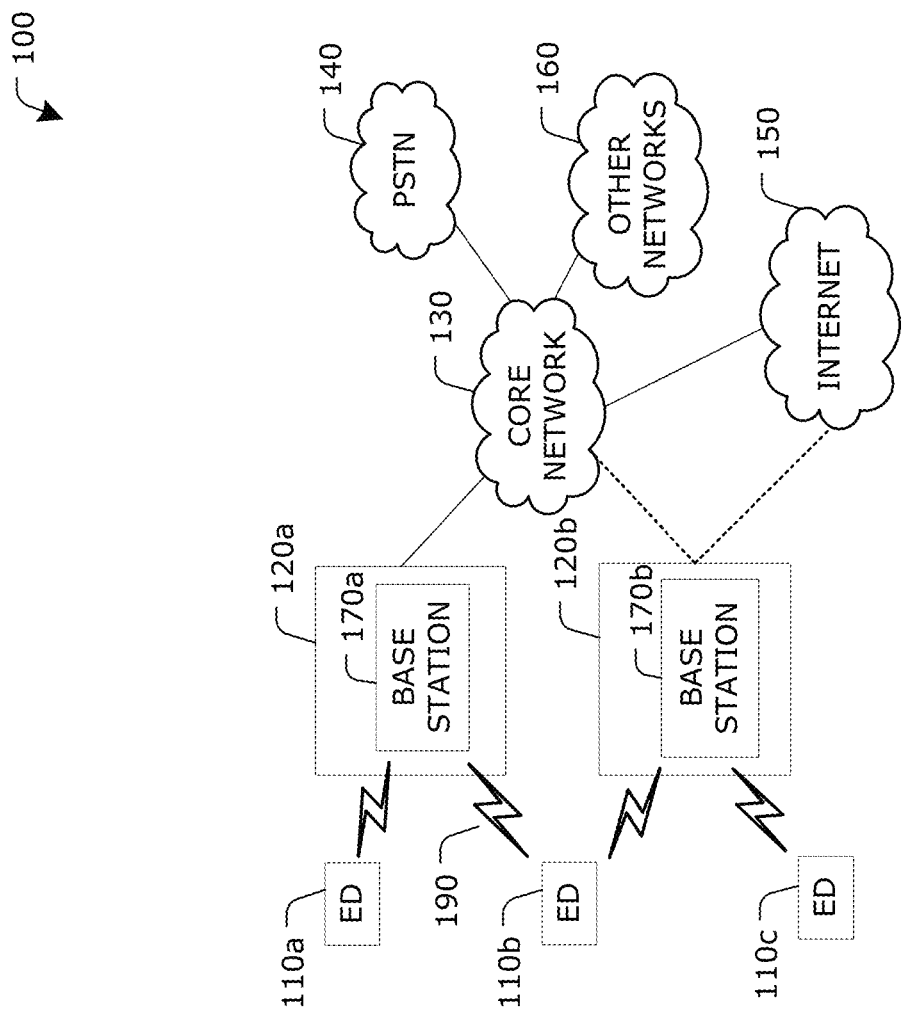
FIG. 1 is a network diagram of an example communication system in accordance with example embodiments of the present disclosure.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (e.g., voice, data, video, text) via broadcast, narrowcast, user device to user device, etc. The communication system 100 may operate by sharing resources such as bandwidth.

In this example, the communication system 100 includes electronic devices (ED) 110a-110c (generically referred to as ED 110), radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c may be configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, smart device, or consumer electronics device, among other possibilities.

In FIG. 1, the RANs 120a-120b include base stations 170a-170b, respectively. Each base station 170a-170b (generically referred to as base station 170) is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB (gNB), a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RANs may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2A:
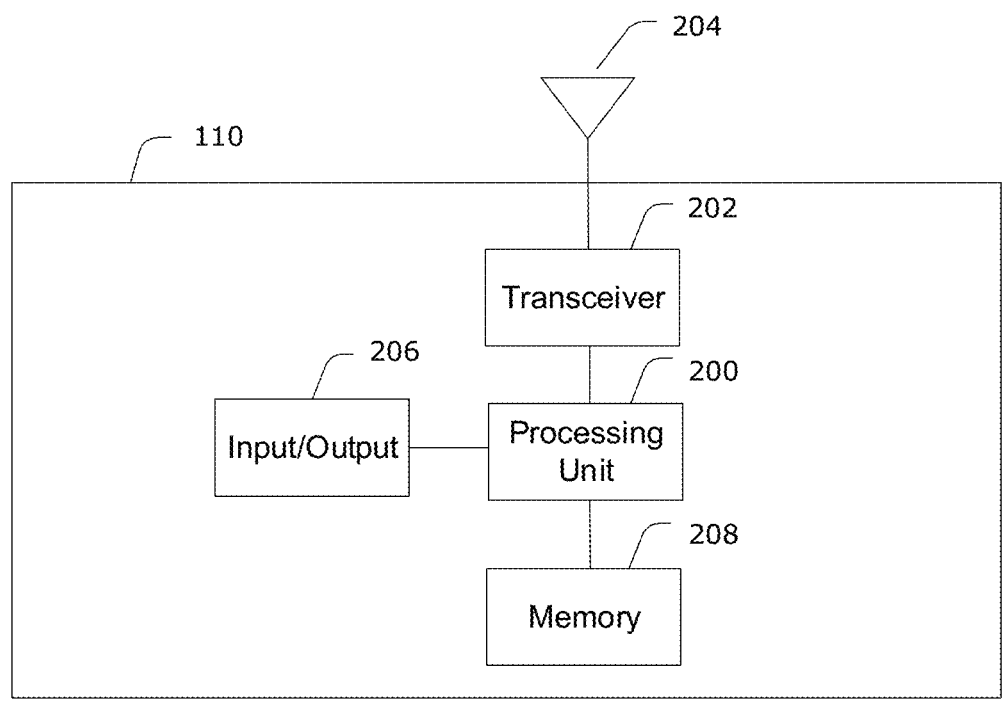
FIG. 2A is a block diagram of an example electronic device in accordance with example embodiments of the present disclosure.
Figure 2B:
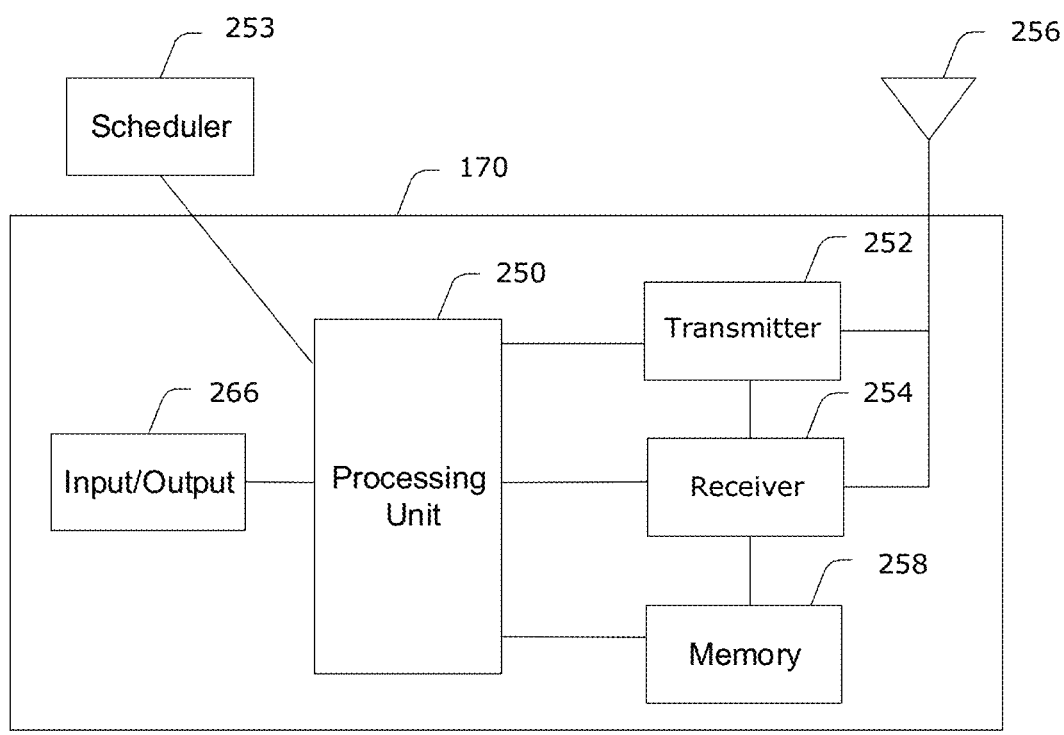
FIG. 2B is a block diagram of another example electronic device in accordance with example embodiments of the present disclosure.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. In some examples, one or more antennas 204 may be an array antenna 204, which may be used to perform beamforming and beam steering operations. Although shown as a single functional unit, a transceiver 202 could also be implemented using at least one transmitter and at least one separate receiver.

The ED 110 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs 110 or other devices. Each receiver 254 includes any suitable structure for processing signals received wirelessly or by wire from one or more EDs 110 or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an array antenna, which may be used for beamforming and beam steering operations. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Figure 3A:
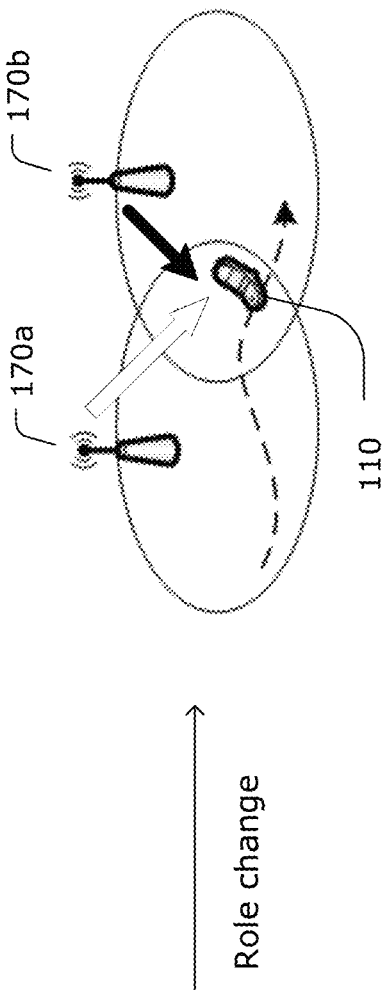
FIGS. 3A-C are schematic diagrams illustrating an example of role change and handover between two base stations.
Figure 3B:
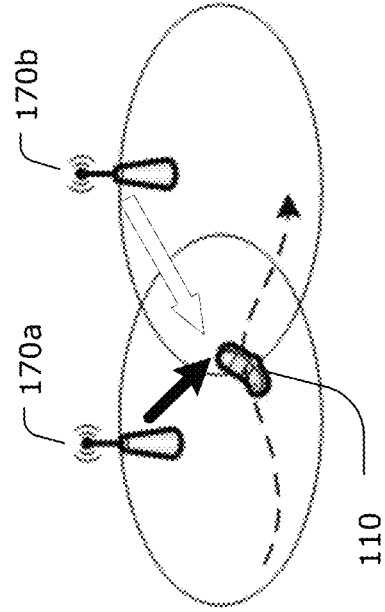
Figure 3C:
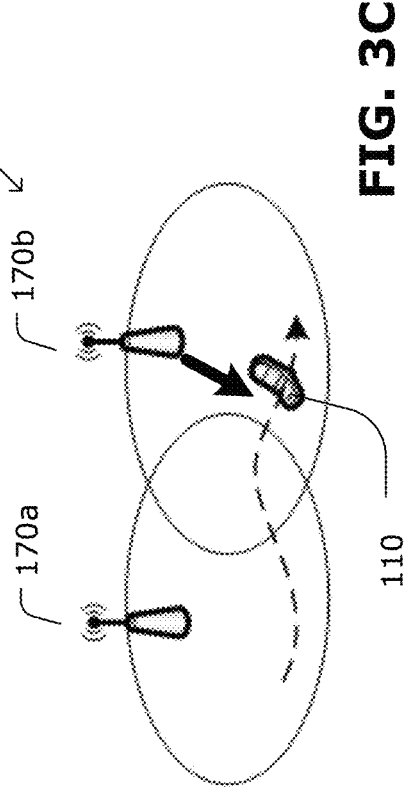

FIGS. 3A-3C schematically illustrate an example of role change and handover as an ED 110 moves between coverage of different base stations 170. In the example shown, dual connectivity is supported, in which an ED 110 may have connection to two or more base stations 170 at the same time. Generally, in the present disclosure, the term base station may also be used synonymously with the term serving cell or the term transmission/reception point (TRP). The term base station may be used as a shorthand to refer to a serving cell of the base station (e.g., a primary cell of the cell group of the base station).

In FIG. 3A, the ED 110 is initially connected with a first base station 170a. The first base station 170a (e.g., a first gNB) initially provides the primary connection (indicated by thick black arrow) with the ED 110 and serves the role of the master gNB (M-gNB). The second base station 170b (e.g., a second gNB) of a target cell may be added to provide a secondary connection (indicated by white arrow) with the ED 110 and to serve the role of the secondary gNB (S-gNB). In some examples, there may be a group of serving cells associated with a base station. In the case of a M-gNB, the associated group of cells may be referred to as the master cell group (MCG); and in the case of a S-gNB, the associated group of cells may be referred to as the secondary cell group (SCG). Each cell group may include a primary cell (SpCell) and optionally one or more secondary cells (Scell). Scell should not be confused with SCG. That is, the MCG includes both SpCell and optional Scells; similarly, the SCG includes both SpCell and optional Scells. The SpCell of the MCG may be designated as PCell. The SpCell of the SCG may be designated as PSCell. When the ED 110 is connected to the M-gNB, the ED 110 may be connected via the PCell. When the ED 110 is connected to the S-gNB, the ED 110 may be connected via the PSCell.

The second base station 170b may be added as the S-gNB for the ED 110 using suitable techniques. For example, when the ED 110 moves and reports measurements for a candidate target cell for mobility, the second base station 170b that is serving the target cell may be configured as the S-gNB for the ED 110, using a New Radio (NR) procedure similar to the addition of secondary Node B (SeNB) in LTE. Configuration of the second base station 170b as the S-gNB may include the ED 110 obtaining configuration information for the second base station 170b. Such configuration information may include, for example, information about which cell of the base station 170b to use as the primary cell (e.g., the PSCell). The configuration for adding S-gNB to serve the ED 110 may also include configuring a bearer split at the packet data convergence protocol (PDCP) layer in the M-gNB (i.e., the first base station 170a) or configuring a bearer routed via the S-gNB (i.e., the second base station 170b).

As the ED 110 moves from the coverage area of the first base state 170a to the coverage area of the second base station 170b, a handover may be required between the base stations 170a, 170b. The handover may begin with a role change between the base stations 170a, 170b. When dual connectivity is being used, the role change means that the roles of M-gNB and S-gNB are switched between the first and second base stations 170a, 170b. That is, the first base station 170a switches from the role of M-gNB to the role of S-gNB; and the second base station 170b switches from the role of S-gNB to the role of M-gNB.

As illustrated in FIG. 3B, the result of the role change is that the primary connection (indicated by thick black arrow) is now provided by the second base station 170b and the secondary connection (indicated by white arrow) is now provided by the first base station 170a.

The role change between M-gNB and S-gNB may be considered as a change in role between the PCell and PSCell, in the case of dual connectivity. In conventional LTE, when the role of PCell is to be changed to another cell, a handover procedure may be executed using random access procedure (RACH) and layer 2 (L2) reset. Such a procedure may cause unwanted interruption in the connection experienced by the ED 110. In examples of the present disclosure, interruptions may be avoided, or their effects mitigated. When the ED 110 has dual connectivity to both the base stations 170a, 170b, the ED 110 already has access to and is synchronized with both base stations 170a, 170b. Thus, changing the role of the second base station 170b from S-gNB to M-gNB should not require RACH, and should not require L2 reset/re-establishment, because no new connection is being established. Accordingly, because the role change of the base stations 170a, 170b and activation of their respective cells occurs in parallel, data transmission to/from the ED 110 may continue with no significant interruption during the role change.

In some cases, if the ED 110 remains within the coverage areas of both base stations 170a, 170b, the handover may be complete after the role change. In the case where the ED 110 moves further and leaves coverage of the first base station 170a, the second base station 170b (which is now the M-gNB for the ED 110) may use a suitable S-gNB release procedure to release the first base station 170a (which is now the S-gNB for the ED 110). After the S-gNB has been released, the ED 110 may be connected only to the second base station 170b, as shown in FIG. 3C.

Figure 4:
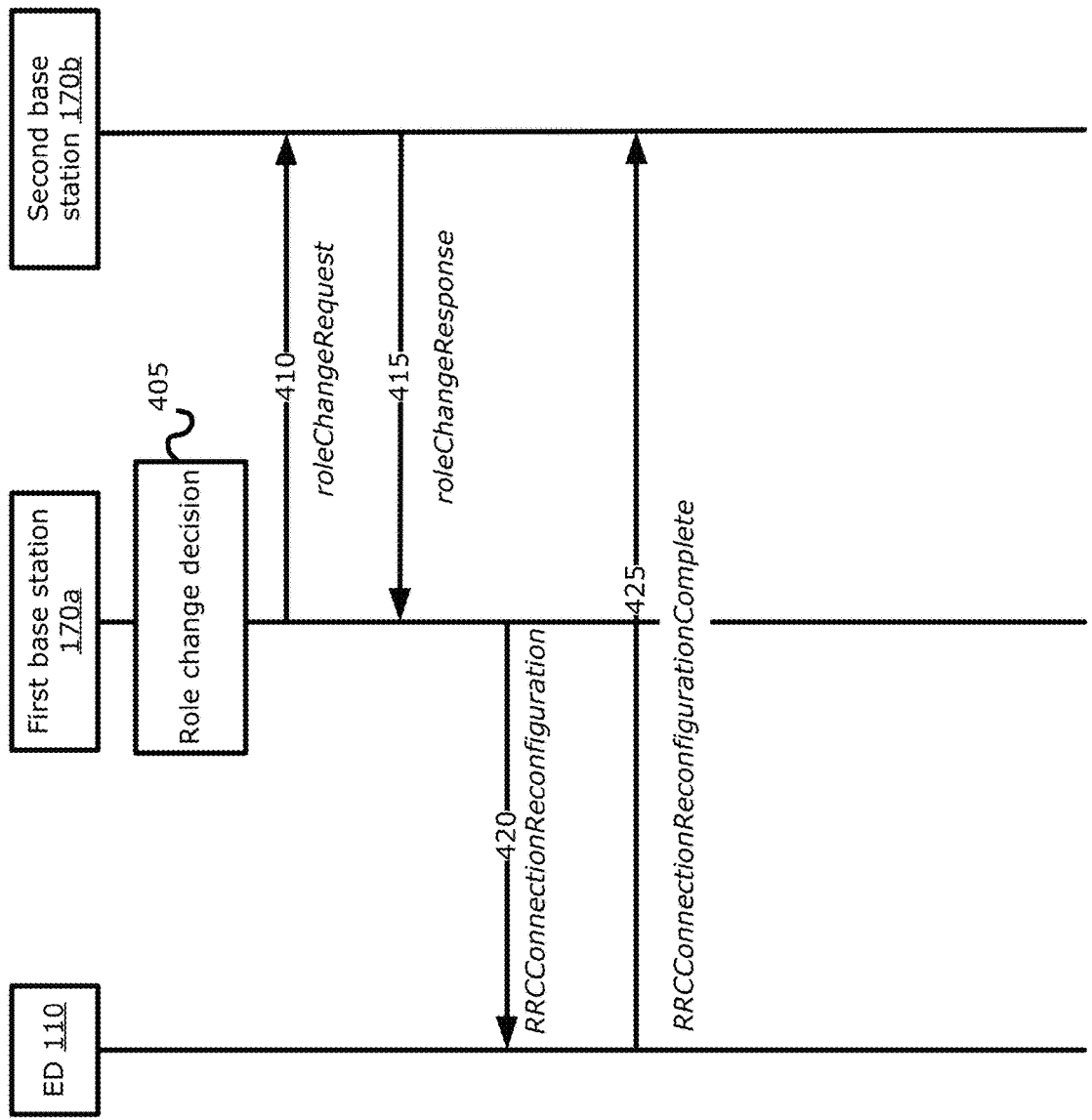
FIG. 4 is a signaling diagram illustrating an example method for role change that relies on RRC signaling.

During the role change, the conventional approach is to reconfigure the ED 110 to use the target cell as the new PCell, for example using radio resource control (RRC) signaling. FIG. 4 is a signaling diagram that illustrates an example of the conventional signaling to perform a role change and ED reconfiguration.

In the example of FIG. 4, the first base station 170a is initially connected to the ED 110, and a role change is required to hand the ED 110 over to the second base station 170b. In this context, the first base station 170a may be referred to as the source gNB and the second base station 170b may be referred to as the target gNB.

A role change decision is made by the first base station 170a at 405. For example, the first base station 170a may detect that the ED 110 is moving towards the edge of the coverage area served by the first base station 170a, and thus determine that a role change is needed to perform a handover to the second base station 170b. At 410, the first base station 170a notifies the second base station 170b, via backhaul communication, that a role change is requested (e.g., by sending a roleChangeRequest message via backhaul links). At 415, the second base station 170b responds to the first base station 170a, via backhaul communication (e.g., by sending a roleChangeResponse message via backhaul links). It should be noted that, depending on the backhaul technology used, if the backhaul connection (e.g., fiber or cable wired connection) between the two base stations 170a, 170b is long, the communications via backhaul may introduce latency that may be too long to satisfy URLLC requirements.

After receiving the response from the second base station 170b, at 420, the first base station 170a transmits reconfiguration information to the ED 110, to reconfigure the ED 110 to connect to the second base station 170b. This reconfiguration is triggered via RRC signaling (e.g., by sending a RRCConnectionReconfiguration message via RRC signaling). In response, the ED 110 performs the reconfiguration and, at 425, transmits a communication to the second base station 170b to indicate that the ED 110 has been reconfigured. This communication is also via RRC signal (e.g., by sending a RRCConnectionReconfigurationComplete message via RRC signaling). This RRC reconfiguration procedure may take in the range of 10 ms to several hundred ms to complete. During the RRC configuration procedure, data transmission may be scheduled only using fallback downlink control information (DCI), which has low spectrum efficiency. This may lead to lower URLLC capacity and/or may cause blocking between EDs 110 using URLLC. As well, considering the requirements for high reliability and low latency, using RRC signaling to perform this reconfiguration (e.g., reconfiguring the ED 110 to use the target cell of the second base station 170b as the PCell) may introduce significant and possibly unacceptable overhead. For example, reliance on the RRC reconfiguration procedure may introduce a latency in the range of 10 ms or more, which may not satisfy URLLC requirements for latency of no more than 1 ms.

In examples disclosed herein, dynamic signaling (e.g., UCI/DCI signals carried by physical downlink control channel (PDCCH) or physical uplink control channel (PUCCH)) is used to perform the role change and/or configuration, instead of slower backhaul or higher-layer signaling (e.g., RRC signaling). Dynamic signaling, in the context of LTE and later generation wireless communications, is generally understood to refer to signaling that can occur at short time intervals, such as every sub-frame or every time slot. Dynamic signaling may be performed using physical layer signaling, as opposed to higher layer signaling. The use of dynamic signaling to perform the role change and/or reconfiguration may help to reduce latency and satisfy requirements for URLLC. In various examples, current UCI and DCI signal formats may be adapted to enable the use of dynamic signaling over the physical layer for performing the role change.

Figure 5A:
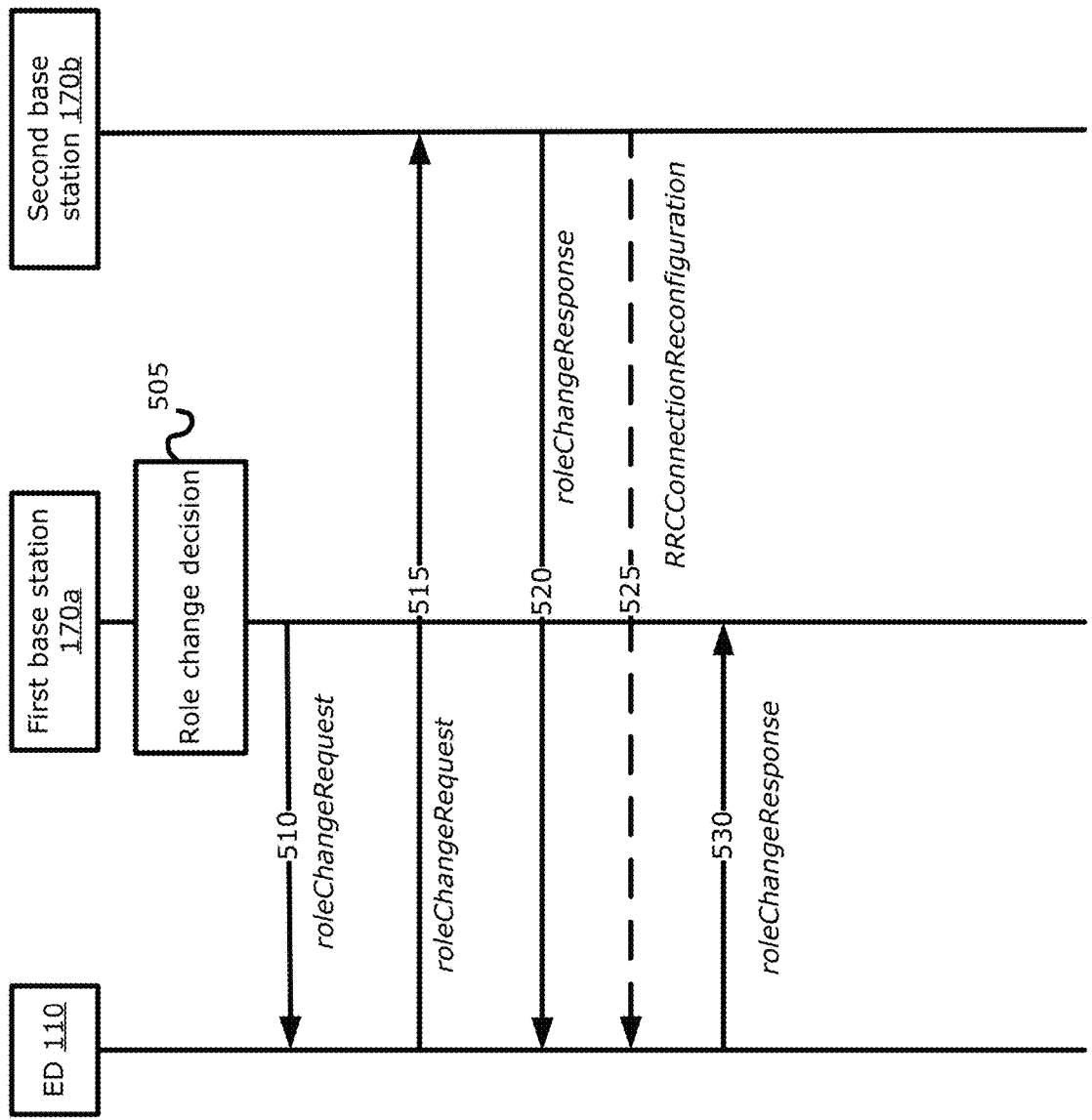
FIG. 5A is a signaling diagram illustrating an example method for role change using dynamic signaling, in accordance with example embodiments of the present disclosure.

FIG. 5A is a signaling diagram illustrating an example of the disclosed method for role change, in which dynamic signaling is used. The entities involved in the signaling in this example are the same as those of FIG. 4, namely the ED 110, the first base station 170a (also referred to as the source gNB) and the second base station 170b (also referred to as the target gNB).

Similarly to the example of FIG. 4, the first base station 170a may, at 505, make a role a role change decision to initiate the role change with the second base station 170b. The first base station 170a, at 510, communicates a request for role change to the ED 110, using dynamic signaling (e.g., by transmitting a roleChangeRequest message via DCI signaling over PDCCH). The request for role change may be communicated using an adapted DCI format, as discussed further below.

Generally, the dynamic signals in the example of FIG. 5A may be sent using uplink or downlink signals (depending on whether the signals are being sent downlink or uplink), via respective downlink or uplink channels, such as PDCCH or PUCCH. In some examples, downlink or uplink data (e.g., roleChangeRequest message and/or roleChangeResponse message) may be sent via physical downlink shared channel (PDSCH) or physical uplink shared channel (PUSCH), after receiving a downlink or uplink grant (e.g., after the ED 110 receives a grant via DCI). For example, for grant-based transmission, the ED 110 may send a scheduling request (SR) via PUCCH, receive the uplink grant (e.g., via a DCI received over PDCCH), and then send an uplink message via PUSCH. Where grant-free transmission is used, the ED 110 may send the uplink message via PUSCH, without need for SR and uplink grant.

The ED 110, at 515, relays the request for role change to the second base station 170b, using dynamic signaling. For example, the ED 110 may relay the roleChangeRequest message via a physical layer signal, such as an uplink control information (UCI) signal over PUCCH or over PUSCH (where the ED 110 has received an uplink grant to send data over PUSCH). The request for role change may be communicated using an adapted UCI format, as discussed further below. In some examples, the ED 110 may relay the request for role change via a sounding reference signal (SRS) message.

In some examples, where at 510 the ED 110 received the request for role change from the first base station 170a via PDSCH, the ED 110 may relay the same message to the second base station 170b via PUSCH, or the ED 110 may relay a message that may be modified from the received message. In some examples, the message sent by the ED 110 at 515 may be a new UCI signal generated by the ED 110, for example.

The second base station 170b, at 520, responds to the ED 110, using dynamic signaling (e.g., by transmitting a roleChangeResponse message via a physical layer signal, such as a DCI signal via PDCCH or PDSCH). The response message may be communicated using an adapted DCI format, as discussed further below. The response message from the second base station 170b may include information to indicate to the ED 110 that the second base station 170b is ready for the role change. In examples where the ED 110 already has configuration information for the second base station 170b, the ED 110 may, in response to receiving the response message, perform appropriate reconfiguration in order to establish primary communication with the second base station 170b. For example, the ED 110 may activate pre-configured protocol stack configurations for the PDCP anchor, to change the anchor to the second base station 170b.

Optionally, at 525, the second base station 170b may also send configuration information to the ED 110 (e.g., the second base station 170b providing information about itself, which may include security information, and including configuration information that the ED 110 may use for connected to the PCell). The configuration information, which may be in the form of a RRCConnectionReconfiguration message, may be sent via dynamic signaling (e.g., over physical layer) instead of RRC or other higher layer signaling. In some examples, the configuration information may be a simplified form of the configuration information that is conventionally sent via RRC signaling. For example, the message may contain a security key for the second base station 170b. In some examples disclosed herein and discussed further below, the communication of configuration information to the ED 110 may not be required.

The ED 110, at 530, notifies the first base station 170a of the role change response. The notification is sent via dynamic signaling (e.g., by transmitting a roleChangeResponse message via a physical layer signal, such as a UCI signal or other uplink signal), and may be sent as a grant-based or grant-free uplink transmission. In some examples, where at 520 the ED 110 received the response from the second base station 170b via PDSCH, the response message may be relayed by the ED 110 without modification via PUSCH, or the ED 110 may relay a message that may be modified from the received message. In some examples, the message sent by the ED 110 at 530 may be a new UCI signal generated by the ED 110, for example.

In some examples, the first base station 170a may send an explicit acknowledgement of the role change response to the ED 110 or may send a role change trigger via a dynamic signaling, and the role change may be carried out (e.g., after a predefined time period, such as after a predefined number of symbols or time slots) after the acknowledgement is received at the ED 110. In other examples, the ED 110 may carry out the role change (e.g., switching configuration information between M-gNB and S-gNB) after a preconfigured time or expiration of a timer after receiving the role change request message at 510.

In some examples, signaling may be further simplified by omitting the need to explicitly communicate configuration information to the ED 110. For example, where the ED 110 already has dual connectivity to both the first and second base stations 170a, 170b, the ED 110 may already be connected to first base station 170a as the M-gNB and the second base station 170b as the S-gNB. In such a situation, the ED 110 already has the configuration information for the second base station 170b (and the configuration information for the PSCell of the second base station 170b). Thus, the ED 110 only needs to be informed (e.g., via a shorter dynamic signal, or using information included in the role change request communication or a role change trigger via a dynamic signal) to switch the configuration information between the M-gNB and the S-gNB—that is, switching the first base station 170a from its initial role as the M-gNB to the new role of S-gNB, and switching the second base station 170 from its initial role as the S-gNB to the new role of M-gNB. It should be noted that switching the roles (and configuration information) of M-gNB and S-gNB also includes switching the roles (and configuration information) of PCell and PSCell. In implementation, this switch in configuration information may be triggered by a dynamic signal that replaces the RRCConnectionReconfiguration message from second base station in FIG. 5A, or the switch may be triggered by information already contained in or implied by the roleChangeRequest message in FIG. 5A (in which case the RRCConnectionReconfiguration message may be omitted or the RRCConnectionReconfiguration message may already be available at ED from dual connectivity, i.e. when SCG was added).

In this way, dynamic signaling (e.g., physical layer signaling using DCI and/or UCI signals) may be used to cause an ED 110 to switch configurations between M-gNB and S-gNB, without relying on the use of backhaul signals and RRC signals. The use of dynamic signaling to trigger the role change and reconfiguration may result in a latency of 1 ms or less, thus satisfying URLLC requirements.

In some examples, although generally referred to as "dual" connectivity, the ED 110 may be connected with more than on S-gNB (this may also be referred to as multi-connectivity in some cases). Where the ED 110 is connected with a M-gNB and two or more S-gNBs, one of the S-gNB may be a first S-gNB (e.g., closest to the ED 110, or having the highest connection quality). The role change may then be performed between the M-gNB and the first S-gNB. In other examples, performing the role change may include making a selection of which S-gNB to switch to the role of the M-gNB. For example, as part of the role change decision 505, the current M-gNB may determine (e.g., based on mobility and/or expected future location of the ED 110) which S-gNB would be suitable to switch roles to be the target M-gNB. The current M-gNB may indicate to the ED 110, for example in the roleChangeRequest message, which of the two or more S-gNBs should be the target of the role change. In other examples, the target S-gNB for the role change may be determined by the ED 110. For example, the ED 110 may determine the target S-gNB based on a comparison of the connection quality among the two or more connected S-gNBs, and transmit the roleChangeRequest message to the S-gNB having the highest quality connection. Other such methods may be used to determine the target S-gNB for a role change where the ED 110 has connectivity to more than one S-gNB.

In some examples, a similar procedure may be used to perform a role change between a primary cell and a secondary cell within a cell group. For example, the ED 110 may already have configuration information for connecting to a primary cell and one or more secondary cells of a cell group (e.g., a MCG or SCG). Using dynamic signaling (e.g., UCI/DCI signaling), the base station of the cell group may indicate to the ED 110 that a role change should be performed between the primary and a secondary cell. The ED 110 may then reconfigure itself to switch primary and secondary connections between the primary and secondary cell.

A possible implementation of the dynamic signaling described above may be to adapt existing UCI and DCI formats to provide information for triggering the role change and corresponding reconfiguration at the ED 110. The adapted DCI signal may be used to transmit the roleChangeRequest message, for example. The adapted UCI signal may be used for the roleChangeResponse message.

An example adapted DCI format will be discussed first. FIG. 6A is a table illustrating an example DCI format in accordance with example embodiments of the present disclosure. FIG. 6A shows existing DCI fields, in this example based on DCI format 1_0, and how values in the fields should be set, according to predefined values, in order to indicate the role change and reconfiguration via dynamic signaling, as discussed herein.

In accordance with existing DCI format 1_0, the DCI fields include a header field 605, a frequency domain resource allocation field 610, a time domain resource allocation field 615, a virtual resource block (VRB)-to-physical resource block (PRB) mapping field 620, a hybrid automatic repeat request (HARQ) process field 625, a modulation and coding scheme (MCS) field 630, a new data indicator (NDI) field 635, a redundancy version (RV) field 640, a downlink assignment index (DAI) field 645, a transmit power control (TPC) command for scheduled physical uplink control channel (PUCCH) field 650, a PUCCH resource indicator field 655, a physical downlink shared channel (PDSCH)-to-HARQ_feedback timing (TIMG) indicator field 660, and a cyclic redundancy check (CRC) field 665.

In an example of the present disclosure, the DCI format 1_0 may be adapted to use certain predefined values in the fields to indicate role change and reconfiguration. It should be noted that the predefined values are selected such that the adapted DCI is compatible with existing DCI rules (such that the adapted DCI format is not rejected by the ED 110) and also selected such that the adapted DCI is distinguishable other existing DCI messages (such that the ED 110 can recognize the adapted DCI as an instruction to perform role change and reconfiguration). When received, the CRC bits of the DCI signal are first descrambled (e.g., using a specific radio network temporary identifier (RNTI), as discussed further below). Successful descrambling of the CRC bits may indicate to the ED 110 that the DCI signal is related to role change, as discussed further below. In one example, the header field 605 is one bit long and is always set to '1', to indicate the DCI signal is a downlink signal. The frequency domain resource allocation field 610 and the time domain resource allocation field 615 each have variable bit length, and are each set to all '1'. The VRB-PRC mapping field 620 is one bit long and is set to '0' or set to '1'. The HARQ process field 625 is four bits long and is set to all '0'. The MCS field 630 is five bits long and is set to all '1'. The NDI field 635 is one bit long and is set to '0'. The RV field 640 is two bits long and is set to '00'. The DAI field 645 is two bits long and is set to '00', or may be reserved. The TPC command for scheduled PUCCH field 650 (also referred to as TPC field) is two bits long, and does not have a predefined value. The PUCCH resource indicator field 655 (also referred to as PUCCH resource field) and the PDSCH-to-HARQ_feedback timing indicator field 660 (also referred to as HARQ timing field) are each three bits long, and each does not have a predefined value. The fields that do not have a predefined value may be used to carry feedback information (e.g., information used by the ED 110 for transmitting feedback, such as HARQ timing, PUCCH resource indicator and transmit power control). The CRC field 665 is 24 bits long (or longer or shorter). The CRC bits are generated based on the contents of the other fields of the DCI signal, and appended at the end of the DCI signal. The CRC bits may be scrambled using a particular RNTI, to indicate the intended ED 110 and/or to indicate the type of DCI signal, as discussed further below.

More generally, without referring to a particular existing DCI format, the role change and reconfiguration may be indicated by setting at least two DCI fields to all '0' or all '1'. At least one field may be left without a predefined value, so that the field may carry feedback information (e.g., information used for transmitting the feedback). For examples, a DCI format 1_1 or other downlink grants may be similarly adapted to indicate the role change and reconfiguration. For example, a compact DCI format may be similarly adapted to indicate the role change and reconfiguration. A compact DCI is a DCI format that has a smaller payload size, compared to conventional DCI formats, by using fewer fields and/or using fewer bits per field, thus having fewer overall payload bits. Thus, various existing DCI formats may be adapted, using certain predefined values in the existing DCI fields, to indicate the role change and reconfiguration, using DCI signaling.

When the ED 110 receives the adapted DCI signal, the ED 110 is configured (e.g., by instructions stored in the memory and executed by the processing unit) to process the DCI signal, so that the ED 110 recognizes the received DCI signal and DCI fields as instruction to perform the role change and reconfiguration. The ED 110 may unscramble the parity bits contained in the CRC field 665 using a specific RNTI. For example, the parity bits may be scrambled using master cell RNTI (MS-C-RNTI) (i.e., RNTI that is associated with master cell and/or primary cell and/or secondary cell(s) in a MCG), secondary cell RNTI (M-S-RNTI) (i.e., RNTI that is associated with primary cell and/or secondary cell(s) in a SCG), URLLC-RNTI (also referred to as new-RNTI in the context of NR), or MCS-C-RNTI. The ED 110 may perform this parity check in order to determine if the DCI signal is intended for itself.

The ED 110 processes the received DCI signal and determines that certain field(s) have been set with predefined value(s) (e.g., frequency domain resource allocation field 610 and time domain resource allocation field 615 both set to all '1') to indicate that there should be a role change between the M-gNB (e.g., initially the first base station 170a) and the S-gNB (e.g., initially the second base station 170b) (and also change between the PCell of the M-gNB and the PSCell of the S-gNB; or change between primary cell of MCG and the first secondary cell of the SCG). The ED 110 may thus validate the DCI signal as a role change signal, and the ED 110 internally switches the roles of the M-gNB and the S-gNB. The ED 110 may also internally reconfigure itself to switch the configuration information of the M-gNB and the S-gNB (and the configuration information of the PCell and PSCell), where the ED 110 already has configuration information for both base stations 170a, 170b because dual connectivity is used.

If the parity check fails or the DCI fields do not follow a recognized format, the ED 110 may consider the DCI signal to be an invalid signal and ignore the received DCI signal.

In some examples, the adapted DCI signal may include one or more fields with values adapted to indicate which S-gNB is the target for a role change (e.g., where the ED 110 has connectivity with more than one S-gNB) and/or which cell of the S-gNB should become the PCell after the role change. For example, an existing DCI field may be adapted to carry information (e.g., two bits or four bits of information—for up to 16 different possible targets) to indicate which S-gNB and/or which cell should become the M-gNB and/or the PCell after the role change. In some cases, the bits within a field may be used to identify both the target S-gNB and target cell for the role change. For example, the first few bits in the field may be used to specify the target S-gNB and the remaining bits in the field may be used to identify the target cell for the role change. For example, the adapted DCI signal may be based on the existing DCI format 1_1, which includes a carrier indicator field. The carrier indicator field may be adapted to carry a value to identify which cell of the S-gNB should be used as the PCell after the role change.

In some examples, the DCI signal might not include information identifying the target cell of the S-gNB for the role change. In that case, the ED 110 may be configured to automatically use the first cell in the cell group of the S-gNB as the target cell for the role change.

In some examples, the DCI signal might not include information identifying the target S-gNB for the role change. In that case, the ED 110 may be configured to automatically identify the only S-gNB (e.g., where the ED 110 is connected with only one S-gNB) or the first or nearest S-gNB (e.g., where the ED 110 is connected with more than one S-gNB) as the target for the role change.

In some examples, the adapted DCI signal may be a group DCI signal intended to enable role change and reconfiguration for a group of EDs 110. For example, in the context of the example in FIG. 5, the roleChangeRequest message may be a group DCI signal that is transmitted to a group of EDs 110 that are initially served by the first base station 170a as the M-gNB. The group DCI signal may use a group RNTI (e.g., MS-C-RNTI, M-S-RNTI or URLLC-RNTI, MCS-C-RNTI) to scramble the CRC parity bits. The adapted group DCI signal may include information indicating specific S-gNB or specific PSCell to be used as the target for each respective ED 110 in the group. Each ED 110 may be provided with a respective indication of which PSCell to be used as the target, or a respective indication of which cell group to be used as the target. For example, the group DCI may contain PSCell or Scell indication1, PSCell or Scell indication2, and so forth, where the indication number may indicate the cell index configured by higher layer signaling for each ED 110. For example, using higher layer signaling, each ED 110 may have been configured with cell configurations, each cell having a respective index. In an example implementation, PCell is given index 0, and other cells (including SCells and PSCells) is given indices from 1-31 (or other index range). SCell and PSCell indices may be assigned similarly, for example in consecutive order following index 0, although other indexing schemes may also be used. It should be noted that the PSCell and SCell indices may be shared between cell groups, so that an ED 110 may be able to determine which cell group it belongs to, based on the SCell index provided to the ED 110. Each ED 110 in the group of EDs 110 may be assigned a specific position within the DCI signal, so that each ED 110 is configured to determine its respective target by reading the information contained in the assigned position of the DCI signal. For example, if a cell index is indicated using 5 bits, a first ED 110 in the group may be assigned position 1 (corresponding to the first 5 bits), and a second ED 110 in the group may be assigned position 2 (corresponding to the second 5 bits). Accordingly, the first ED 110 reads bits 1-5 of the group DCI signal to determine its target cell index; and the second ED 110 reads bits 6-10 of the group DCI signal to determine its target cell index. Each ED 110 may thus determine its respective target for the role change.

Thus, each ED 110 in the group may perform a role change and reconfiguration with a different target S-gNB (and different target cell). Alternatively, the group DCI signal might not specify the target S-gNB or the target cell for the role change, and each ED 110 may automatically identify the target S-gNB or target cell for the role change, similarly to that described above.

An example adapted UCI format will now be discussed. Conventional UCI formats include fields for carrying HARQ-ACK information, SR and channel state information (CSI). A UCI message may be carried over PUCCH, or may be multiplexed in or carried over PUSCH. Where PUCCH is used for UCI transmission, there are five conventional PUCCH formats. PUCCH format 0 is used when: the transmission is 1 or 2 symbols long, and the number of HARQ-ACK information bits with positive or negative SR (HARQ-ACK/SR bits) is 1 or 2. The HARQ-ACK/SR bits that are carried are based on which sequence is used (distinguished by at least the sequence cyclic shift). For example, for 2-bit HARQ-ACK of '01' with a positive SR, the sequence cyclic shift of 4 is used. For other values, other cyclic shifts may be used. PUCCH format 1 is used when: the transmission is 4 or more symbols long, and the number of HARQ-ACK/SR bits is 1 or 2. The UCI bits are modulated in a sequence. PUCCH format 2 is used when the transmission is 1 symbol or 2 symbols long, and the number of UCI bits is more than 2. The UCI bits are encoded and a cyclic prefix (CP)-OFDM waveform is used. PUCCH format 3 is used when the transmission is 4 or more symbols long, and the number of UCI bits is more than 2. The UCI bits are encoded and a CP-OFDM waveform is used. PUCCH format 4 is used when the transmission is 4 or more symbols long, the number of UCI bits is more than 2, and a PUCCH resource includes an orthogonal cover code. The UCI bits are encoded and a CP-OFDM waveform is used. It should be noted that multiple different UCI types can be multiplexed into one PUCCH, for example HARQ-ACK together with SR, periodic/semi-persistent CSI together with SR, HARQ-ACK together with CSI, or HARQ-ACK together with CSI and SR.

In order to be recognized as a message related to role change (rather than another conventional message), an adapted UCI signal that is used to carry a roleChangeRequest message or a roleChangeResponse message should be distinguishable from a conventional UCI signal that carries HARQ-ACK, SR or CSI.

In an example, dedicated resources or resource sets may be defined (e.g., configured by higher layer signaling) for PUCCH. The dedicated resources or resource sets are used to carry UCI signals with role change request or response messages. The role change request messages may be carried using the same or different resources as those carrying role change response messages. The dedicated resources for carrying role change request messages may be configured using RRC configuration at the target base station. The dedicated resources for carrying role change response messages may be configured using RRC configuration at the source base station. Each base station may be configured to look for and recognize role change request or response messages over the respective dedicated resources.

In another example, the UCI signal may be adapted from PUCCH formats 2, 3 or 4. For example, the UCI signal may be scrambled with a specific RNTI (which may be the same as or different from that used by the conventional UCI signal). DCI signals carrying role change request messages may be scrambled using an RNTI that is the same as or different from the RNTI used to scramble DCI signals carrying role change response messages. The base station may be configured (e.g., by instructions stored in the memory and executed by the processing unit) to determine that when the UCI signal is successfully unscrambled by the specific RNTI, this indicates a role change request or role change response message.

In R15, the PUCCH formats 0 and 1 carry information based on the characteristics of low-Peak-to-Average Power Ratio (low-PAPR) sequences (e.g., a Zadoff Chu sequence, a computer-generated sequence). The characteristics of PUCCH formats 0 and 1 may include at least the base sequence, cyclic shift and modulated symbol on the sequence. The cyclic shift may include an initial cyclic shift ($m\_0$) and a given cyclic shift ($m\_cs$) where each or all of the cyclic shift(s) may be individually configured or specified, for example by RRC, the standard signaling and/or dynamic signaling. An example adapted UCI format may be adapted from PUCCH formats 0 and 1. For example, the base station may be configured (e.g., using RRC signaling) to recognize another initial cyclic shift as indicating the role change request or role change response message. Additionally or alternatively, the base station may be configured (e.g., using RRC signaling) to recognize a unique sequence cyclic shift, which is different from those conventionally used, as indicating a role change request or role change response message. In some examples, the base station may dynamically recognize the unique sequence cyclic shift (e.g., without being configured via RRC signaling ahead of time, or the unique sequence cyclic shift being different from the configured value), for example using blind detection on other possible values.

An example adapted UCI format may be adapted from PUCCH format 0 as specified in the standard, transmitted using the SR, where an initial cyclic shift ($m\_0$) may be configured by RRC. For example, in PUCCH format 0, under R15, a sequence cyclic shift ($m\_cs$) of 0 is used to indicate a positive SR. In the example adapted UCI format, a different sequence cyclic shift may be used to indicate a role change request or role change response message. For example, $m\_cs=2$ may be used to indicate a role change request message, and $m\_cs=5$ may be used to indicate a role change response message. The target cell for the role change may or may not be explicitly indicated. In the case of a role change request message, for example, the first PSCell in the SCG (i.e., the cell group of the target base station) with the lowest index may recognize that the role change request message is for itself. The SR resource configured in the PSCell or SCG may be used for transmitting the role change request message. In the case of a role change response message, for example, the PCell in the MCG (i.e., the cell group of the source base station) may recognize that the role change response message is for itself, and is the response from the PSCell of the SCG with the lowest index for example. The SR resource configured for the PCell or MCG may be used for transmitting the role change response message.

In some examples, the same sequence cyclic shift may be used for both the role change request and the role change response messages, such as where different dedicated resources are used for transmitting the request and response messages (e.g., as described above).

In some examples the target cell for the role change may be explicitly indicated. For example, a first set of sequence cyclic shift values may be used to indicate a role change request message. Each different sequence cyclic shift value in the first set may indicate a different respective PSCell, Scell and/or SCG index as the intended recipient of the role change request message. A second set of sequence cyclic shift values may be used to indicate a role change response message. Each different sequence cyclic shift value in the second set may indicate a different respective PSCell, Scell and/or SCG index as the source of the response message. In some examples, the whole range of possible sequence cyclic shift values may be used for both the role change request and the role change response messages, in the case where different dedicated resources are used for transmitting the request and response messages (e.g., as described above).

Another example UCI format may be adapted from PUCCH format 1, transmitted using the SR resource. Conventionally, under R15, a value of $b(0)=0$ is used to modulate the sequence to indicate a positive SR, where there is an initial cyclic shift (configured by higher layer signaling) associated with the sequence (as defined in TS38.221, section 6.3.2.4.1). An example adapted UCI format may use a different b(0) value, for example b(0)=1, to modulate the sequence in order to indicate a role change request or role change response message. The target cell for the role change may or may not be explicitly indicated. In the case of a role change request message, the first PSCell in the SCG with lowest index value may receive the adapted UCI signal with b(0)=1, and may recognize that this is a role change request message for itself. The SR resource configured in the PSCell or SCG may be used for transmitting the role change request message. In the case of a role change response message, for example, the PCell in the MCG may recognize that this is a role change response message for itself, and that the response is from the first PSCell in the SCG with the lowest index. The SR resource configured for the PCell or MCG may be used for transmitting the role change response message.

In some examples, some other cyclic shift, different from the initial cyclic shift value configured in RRC for conventional UCI signals, may be used to indicate a role change request or response message. The PSCell of the SCG or the PCell of the MCG may detect a signal using PUCCH format 1 with a sequence having b(0)=0 or 1, and an initial cyclic shift different from the RRC configured value. In some examples the target cell for the role change may be explicitly indicated. For example, the receiving cell may use the value of the cyclic shift to identify the PSCell or Scell index that is the intended recipient (in the case where the message is a role change request message) or that is the source of the message (in the case where the message is a role change response message), similar to that described above.

Another example UCI format may be adapted from PUCCH format 0, transmitted using the HARQ resource (e.g., indicated based on the PUCCH resource indicator and/or HARQ_feedback timing indicator associated with the communication with cells in MCG or SCG). Under R15 TS38.213, when the PUCCH format 0 signal transmits only HARQ information, a sequence cyclic shift value of $m\_cs=0$ or 6 is used for 1-bit HARQ-ACK values, and a sequence cyclic shift value of $m\_cs=0, 3, 6$ or 9 is used for 2-bit HARQ-ACK values. When the PUCCH format 0 signal transmits HARQ and SR information, a sequence cyclic shift value of $m\_cs=3$ or 9 is used for 1-bit HARQ-ACK values and positive SR, and a sequence cyclic shift value of $m\_cs=1, 4, 7$ or 10 is used for 2-bit HARQ-ACK values and positive SR.

For 1-bit HARQ with or without SR, sequence cyclic shift values that are not defined for 1-bit HARQ under R15 (e.g., $m\_cs=1, 2, 4, 5, 7, 8, 10$ or 11) may be used to indicate a role change request or role change response message, for example in addition to indicating 1-bit HARQ feedback with or without SR. That is, the role change request or response may be piggybacked on the HARQ feedback with or without SR on the HARQ resource (e.g., as indicated based on the PUCCH resource indicator and/or PDSCH-to-HARQ_feedback timing indicator). In some examples, for 1-bit HARQ without SR, $m\_cs=2$ may indicate a role change request message with HARQ-ACK value=0, and $m\_cs=5$ may indicate a role change request message with HARQ-ACK value=1, where the specific values of $m\_cs$ used for these cases can be configured, for example by higher layer signaling and/or be specified in standard specification. In some examples, for 1-bit HARQ with SR, $m\_cs=8$ may indicate a role change request message with HARQ-ACK value=0 and positive SR, and $m\_cs=11$ may indicate a role change request message with HARQ-ACK value=1 and positive SR. For role change response, different sets of $m\_cs$ may be used, or the same set can be used, because the role change request and response can be transmitted in different resources (because the uplink role change request is associated with the target cell and the uplink role change response is associated with the source cell, and different resources may be used for transmitting to the target cell and to the source cell). It should be noted that the number of bits used for HARQ can be determined and known to both the network and the ED. For 2-bit HARQ with or without SR, sequence cyclic shift values that are not defined for 2-bit HARQ under R15 (e.g., $m\_cs=2, 5, 8$ or 11) may be used to indicate a role change request or role change response message. In some examples, the sequence length used in PUCCH formats 0 and 1 may be longer than that of R15, resulting more possible cyclic shift values to be used in carrying more bits in HARQ feedback, and/or SR bits, and/or role change request bits and/or role change response bits.

The uplink method that is used to transmit the role change request or response, including the resource (e.g., SR resource or HARQ resource) and the format used, may depend on a number of factors. Factors may include which resource is available at the earliest time (e.g., if the SR resource is periodically configured and the period is long, then the HARQ resource may be more appropriate or vice versa), and the number of bits to be transmitted (e.g., different formats may be suitable for different numbers of bits)

Similarly to that described above the target cell for the role change may not be explicitly indicated. In the case of a role change request message, the first PSCell in the SCG with lowest index value may, based on the sequence cyclic shift value, recognize that this is a role change request message for itself. The HARQ resource associated with the communication with the PSCell or SCG may be used for transmitting the role change request message. In the case of a role change response message, for example, the PCell in the MCG may, based on the sequence cyclic shift value, recognize that this is a role change response message for itself, and that the response is from the first PSCell in the SCG with the lowest index. The HARQ resource associated with the communication with the PCell or MCG may be used for transmitting the role change response message.

In some examples the target cell for the role change may be explicitly indicated. For example, a first set of sequence cyclic shift values may be used to indicate a role change request message. Each different sequence cyclic shift value in the first set may indicate a different respective PSCell, Scell and/or SCG index as the intended recipient of the role change request message. A second set of sequence cyclic shift values may be used to indicate a role change response message. Each different sequence cyclic shift value in the second set may indicate a different respective PSCell, Scell and/or SCG index as the source of the response message. For example, $m\_sc=2, 5, 8$ or 11 may indicate a cell index or cell group index of 1, 2, 3 or 4, respectively.

Similarly to the examples described above, the same $m\_cs$ values may be used for both the role change request and the role change response messages, when different dedicated resources are used for transmitting the role change request and role change response messages.

Another example UCI format may be adapted from PUCCH format 2, 3 or 4, which can carry more than two bits. Under the R15 definition for these formats, when the UCI signal carries HARQ-ACK and SR information, the SR bits (there may be more than one for multiple logical channels, with each being transmitted in SR resources with different identifiers) are appended to the HARQ bits and CRC bits. When the UCI signal carries CSI and SR information, the SR bits are prepended to the periodic or semi-persistent CSI information bits and CRC bits. When the UCI signal carries HARQ-ACK, CSI and SR information, the bit order is HARQ-ACK bits, SR bits, CSI bits and CRC bits. Both the ED and the network recognize HARQ-ACK bits, SR bits, CSI bits and CRC bits.

An example adapted UCI format adds at least one bit, appended or prepended to the HARQ-ACK bits, SR bits or CSI bits, to indicate the role change request or role change response message. Because the ED and the network know and recognize the HARQ bits, SR bits, CSI bits and CRC bits, the extra bits are recognized as indicating role change request or role change response.

The target cell for the role change may not be explicitly indicated, such as where one extra bit is added to indicate a role change request or response message. Where the target cell is not explicitly indicated, the first PSCell in the SCG with the lowest index may recognize the role change request as being a message for itself. In the case of a role change response message, the PCell in the MCG may recognize the role change response as being a message for itself, and that the first PSCell in the SCG with the lowest index is the source of the message.

Where more than one bit (e.g., five bits) is added to indicate a role change request or response, the added bits may be used to identify the PSCell, Scell or SCG index as the intended recipient of a role change request or as the source of the role change response message.

In some examples, a role change request or role change response message may be transmitted uplink using an adapted SRS format.

For example, dedicated resources or resource sets may be configured (e.g., using higher layer signaling) for transmitting role change request and response messages. The resources used for transmitting role change request messages may be the same as or different from the resources used for transmitting role change response messages.

In some examples, the SRS may be modified to contain a unique configuration ID (e.g., a value other than that defined for conventional SRS signals) to indicate a role change request or role change response message.

In some examples, extra parameter(s) or a larger range of values may be used for existing parameters in SRS configuration, to indicate a role change request or role change response message. For example, extra parameters may be added to existing configurations for SRS resource set or SRS resource.

An example adapted SRS message may be used to carry role change request and role change response messages, by modifying and/or adding to existing SRS configuration parameters. Under R51 TS38.331, in the SRS-ResourceSet configuration in RRC, the parameter "usage" has the following definition:
usage ENUMERATED {beamManagement, codebook, non-Codebook, antennaSwitching}

In an example adapted SRS message, an additional value "rolechange" may be added to the usage parameter to indicate role change. When the usage parameter is configured to indicate role change in a given SRS resource set, the receiving device (e.g., ED or base station that receives the adapted SRS message) is configured to recognize that the SRS configuration indicates a role change request or response message, and to interpret the parameters of other existing configuration fields of the SRS message as indicating a role change trigger and/or indicating the index of the target cell or target cell group.

FIG. 6B shows parameters and possible parameter values currently defined for SRS resource configuration. When the usage parameter has been set to indicate role change, these parameter values may be interpreted by the receiving device according to different definitions. For example, when usage has been set to the value rolechange, the parameter cyclicShift-n2 may be set to 0 to trigger a role change and/or the value (e.g., ranging from 0 to 7) of the parameter cyclicShift-n2 may indicate the index of the target cell for the role change. Other parameters in SRS configuration may be interpreted similarly.

In some examples, one or more parameters or parameter values may be added to the SRS resource configuration to indicate role change and/or the target of the role change. For example, the parameter startPosition under resourceMapping may have an additional possible parameter value (e.g., 6) defined, which may be interpreted by the receiving device as indicating a role change request or response. The SRS resource configuration may have an added parameter SequenceIdforRoleChange (e.g., which may be defined as BIT STRING (SIZE(10))), which may be interpreted by the receiving device as a trigger for the role change and/or be interpreted as indicating the target cell or target cell group for the role change.

Figure 7A:
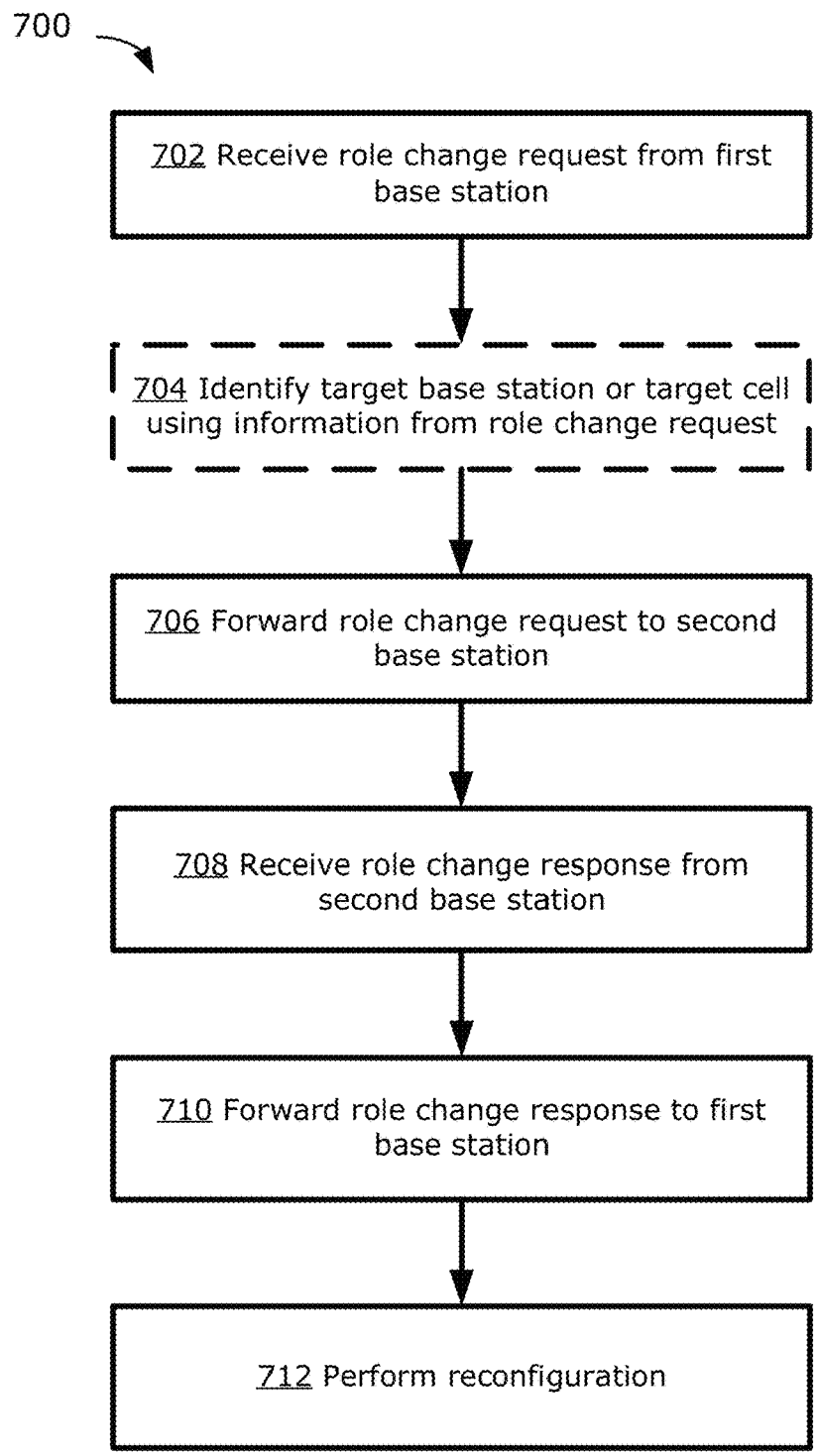
FIG. 7A is a flowchart illustrating an example method for role change using dynamic signaling, from the viewpoint of an ED.

FIG. 7A is a flowchart illustrating an example method 700 for role change using dynamic signaling (e.g., using signaling as shown in FIG. 5A), from the viewpoint of the ED 110. At the start of the method 700, the ED 110 is initially connected to the first base station 170a as the source base station or the M-gNB (and connected to the primary cell of the first base station 170a as the PCell). Where dual connectivity is used, the ED 110 may also be connected to the second base station 170b as the S-gNB (and connected to the primary cell of the second base station 170b as the PSCell).

At 702, the ED receives a role change request from the first base station. The role change request is received via dynamic signaling, for example in the form of downlink data or a DCI signal, such as a DCI signal having an adapted format as discussed above. The ED may validate the received signal (e.g., attempting to unscramble the CRC parity bits using a specific RNTI) and identify the received signal as being a role change request (e.g., validating that certain fields of the DCI signal contain certain predefined values, such as all '1' or all '0', indicating a role change request).

Optionally, at 704, the ED may use information from the role change request to identify the target base station or target cell for the role change. For example, the role change request may be a DCI signal with a DCI field containing the identification of the target S-gNB or target PSCell or target Scell for the role change.

Alternatively, a separate dynamic signal (e.g., a separate DCI signal) may be transmitted from the first base station to the ED to identify the target base station or target cell for the role change.

Where the target base station or target cell information is not contained in the role change request (and is not identified in another signal), the ED may automatically select the first or closest S-gNB (and the first or primary cell of that S-gNB) as the target for the role change. For example, the ED may automatically select the first PSCell of the SCG with the lowest index as the target for the role change.

At 706, the ED forwards the role change request, via dynamic signaling, to the second base station (i.e., the target base station). The ED may forward the role change request as a UCI signal, uplink data or SRS signal, for example using the adapted formats discussed above.

At 708, the ED receives a role change response from the second base station, via dynamic signaling. The role change response may be sent over a downlink channel, such as downlink data over PDSCH or a DCI signal over PDCCH, for example. For example, the role change response may use an adapted DCI format as discussed above.

At 710, the ED forwards the role change response to the first base station, via dynamic signaling. For example, the ED may send the role change response message as a UCI signal over PUCCH, uplink data over PUSCH, or SRS signal (e.g., using the adapted formats discussed above).

At 712, the ED then reconfigures itself to use the second base station as the primary connection. In some examples, 712 may be performed any time after 702 (e.g., after a preconfigured time following 702), without the ED having to receive role change response messages first.

Where the ED already has configuration information for the second base station, 712 may be performed by the ED changing its internal information. For example, the ED may already be connected with the second base station as a S-gNB. In this case, the ED performs reconfiguration by switching configuration information between the M-gNB (the first base station) and the S-gNB (the second base station). Similarly, the ED may perform reconfiguration by switching configuration information between the PCell (the primary cell of the first base station) and the PSCell (the primary cell of the second base station).

Where the ED does not have already configuration information for the second base station (e.g., where dual connectivity is not being used), the ED may receive configuration information from the second base station, via dynamic signaling (e.g., via a DCI signal). The ED may then reconfigure itself accordingly, to establish a connection with the second base station (and the primary cell of the second base station).

The ED is now connected to the second base station as the M-gNB. The ED may continue to be connected to the first base station as the S-gNB. The connection with the first base station may be released.

Figure 7B:
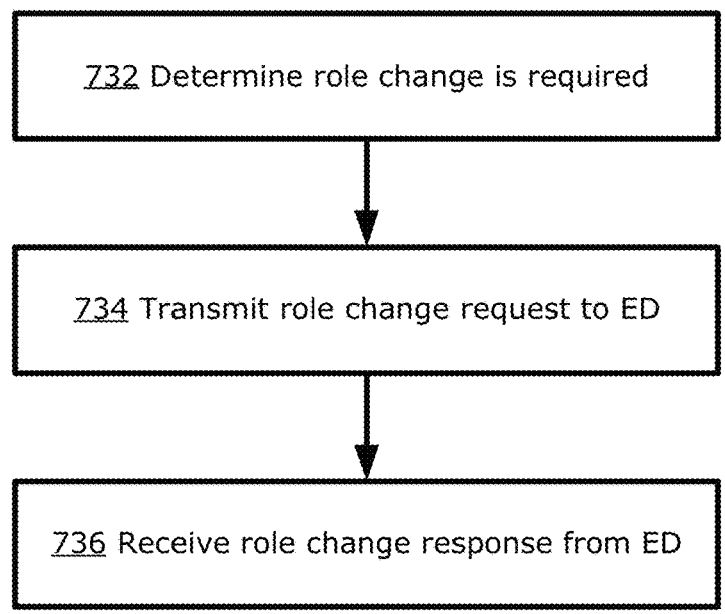
FIG. 7B is a flowchart illustrating an example method for role change using dynamic signaling, from the viewpoint of the base station whose role is initially the source base station.

FIG. 7B is a flowchart illustrating an example method 730 for role change using dynamic signaling (e.g., using signaling as shown in FIG. 5A), from the viewpoint of the base station that is initially the source base station or M-gNB (e.g., the first base station 170*a* in the example of FIG. 5A).

At 732, the first base station determines that a role change is required. For example, the first base station may detect mobility of the ED indicating that the ED is moving towards the edge of the coverage area of the first base station. The first base station may also identify a target base station (e.g., the second base station 170*b* in the example of FIG. 5A) for the role change.

At 734, the first base station transmits a role change request to the ED, via dynamic signaling. For example, the role change request may be a DCI signal, such as a DCI signal adapted from existing DCI formats, as discussed above. The role change request may include information identifying the target base station or target cell for the role change. The role change request may include parity bits scrambled using a specific RNTI to indicate the intended recipient ED.

In some examples, the role change request may be a group request that is transmitted to a group of EDs. The group role change request may include parity bits scrambled using a specific group RNTI to indicate the intended group of recipient EDs. The group role change request may include information identifying the target base station for each respective ED in the group.

At 736, the first base station receives a role change response message from the ED, via dynamic signaling. For example, the notification may be a UCI signal received over PUCCH, uplink data received over PUSCH or a SRS signal. Where the role change request was transmitted to a group of EDs, the first base station may receive a notification from each respective ED in the group, when each respective ED completes the role change.

The first base station may continue to be connected to the ED as the S-gNB. The connection with the ED may be released.

Figure 7C:
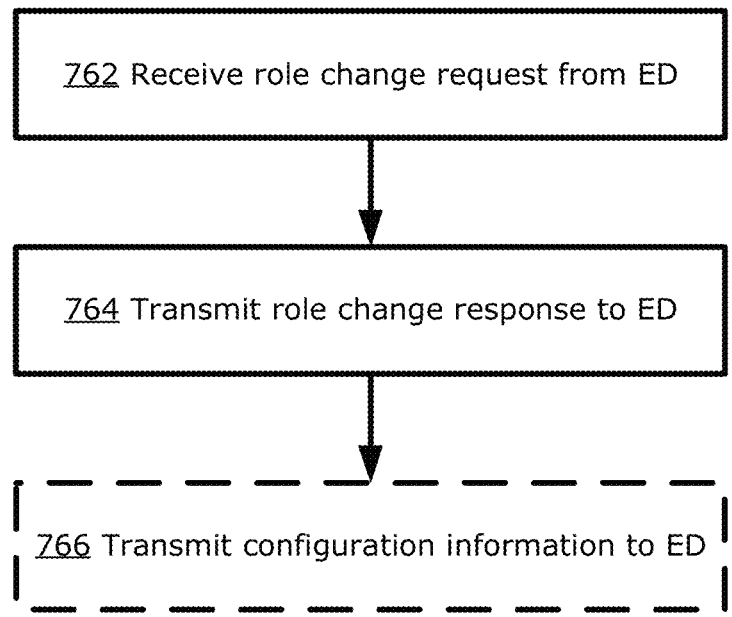
FIG. 7C is a flowchart illustrating an example method for role change using dynamic signaling, from the viewpoint of the base station whose role is initially the target base station.

FIG. 7C is a flowchart illustrating an example method 760 for role change using dynamic signaling (e.g., using signaling as shown in FIG. 5A), from the viewpoint of the base station that is initially the target base station or S-gNB (e.g., the second base station 170*b* in the example of FIG. 5A).

At 762, the second base station receives a role change request from the ED, via dynamic signaling. For example, the role change request may be a UCI signal received over PUCCH, uplink data received over PUSCH or a SRS signal, for example using adapted formats, as discussed above.

At 764, the second base station transmits a role change response to the ED, via dynamic signaling (e.g., using a DCI signal).

Optionally, at 766, the second base station transmits configuration information to the ED to enable the ED to establish a connection with the second base station. 766 may be omitted where the ED already has the configuration information, for example where the ED is already connected with the second base station as a S-gNB.

The second base station is then connected to the ED as the M-gNB.

In some examples, backhaul communication may be used to communicate the role change request and response between the first and second base stations, in addition to the use of dynamic signaling as discussed herein. For example, the first base station may communicate a role change request to the second base station, and then dynamic signaling (e.g., DCI signaling) may be sent to trigger role change at the ED. Where dual connectivity is used and both the first and second base stations already have established connections with the ED, the role change may be triggered using dynamic signaling from the first or the second base station, or both first and second base stations may transmit the same DCI signal to the ED (e.g., for spatial diversity).

Figure 5B:
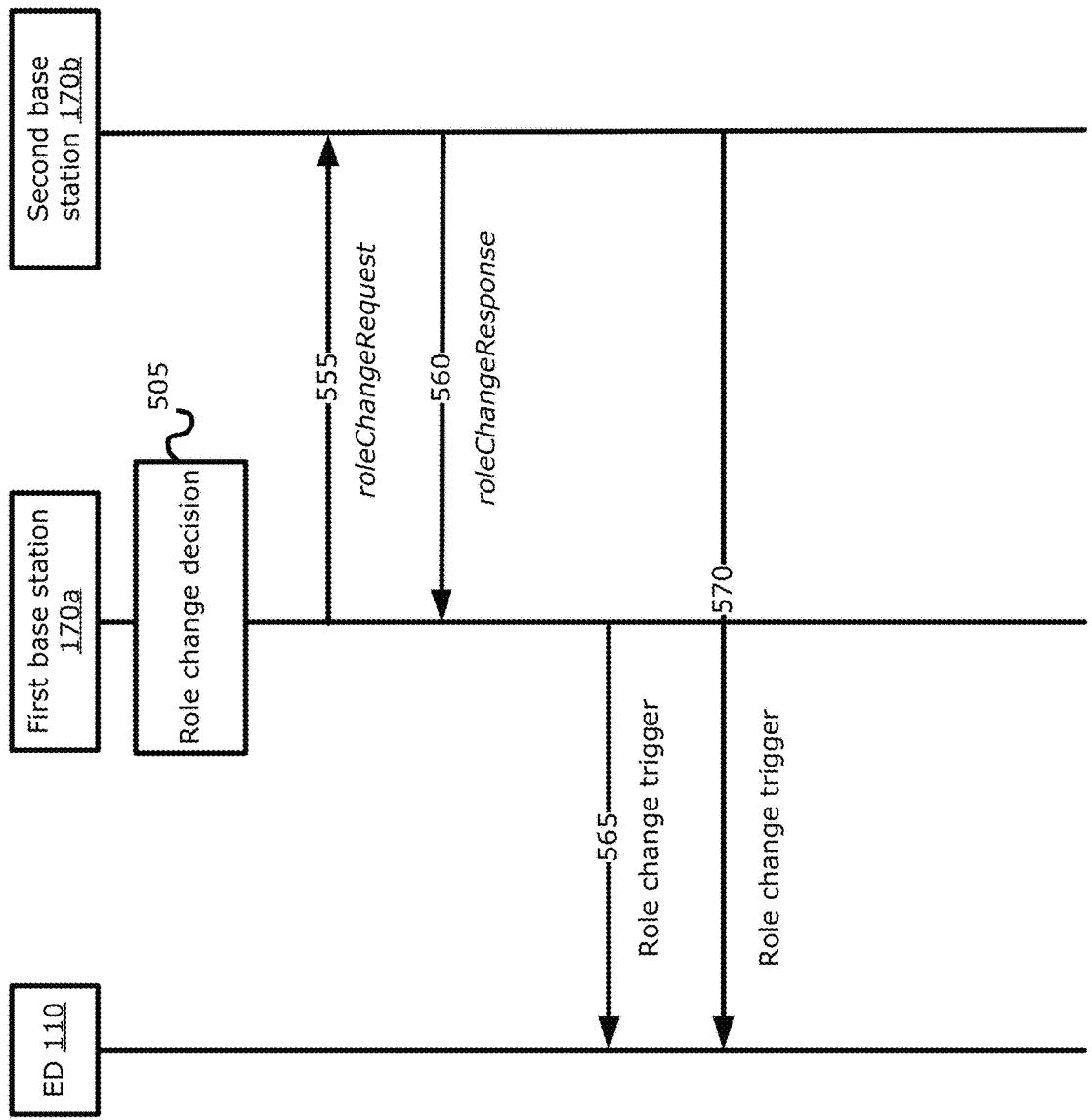
FIG. 5B is a signaling diagram illustrating another example method for role change using dynamic signaling, in accordance with example embodiments of the present disclosure.

FIG. 5B is a signaling diagram illustrating an example of the disclosed method for role change, in which dynamic signaling is used together with backhaul communication. The entities involved in the signaling in this example are the same as those of FIG. 5A, namely the ED 110, the first base station 170*a* (also referred to as the source gNB) and the second base station 170*b* (also referred to as the target gNB).

Similarly to the example of FIG. 5A, the first base station 170*a* may, at 505, make a role change decision to initiate the role change with the second base station 170*b*. Similarly to the example of FIG. 4, at 555, the first base station 170*a* transmits a role change request message to the second base station 170*b* via a backhaul link. At 560, the second base station 170*b* responds with a role change response message to the first base station 170 via a backhaul link. In some examples, the second base station 170*b* may make a role change decision at 505 to initiate the role change with the first base station 170*a*, in which case the second base station 170*b* performs 555 in the opposite direction to transmit the role change request to the first base station 170*a*.

The first base station 170*a*, at 565, transmits a role change trigger to the ED 110, using dynamic signaling (e.g., by transmitting a modified DCI signal, as discussed above). The second base station, at 570, may also transmit the role change trigger to the ED 110, using dynamic signaling (e.g., by transmitting a modified DCI signal, as discussed above). The role change trigger may be transmitted by only the first base station 170*a*, only the second base station 170*b*, or both base stations 170*a*, 170*b*. The role change trigger may be a DCI signal with CRC bits scrambled by a specific RNTI, for example as discussed above, which the ED 110 recognizes as indicating a role change. Other examples of dynamic signaling may be used as the role change trigger.

When the ED 110 receives the role change trigger, (as long as the ED receives and understands at least one of the triggering signals if the role change trigger has been transmitted from either base station or both base stations 170*a*, 170*b*), the ED 110 may then perform the role change by reconfiguring its internal configuration information (e.g., switching configuration information between the M-gNB and S-gNB). In some examples, the ED 110 may transmit the acknowledgement to either or both base stations 170*a*, 170*b* and/or wait for a pre-configured time and then reconfigure its internal configuration information (e.g., switching configuration information between the M-gNB and S-gNB). This signaling may enable both the ED 110 and both base stations 170*a*, 170*b* to have the correct understanding of their respective roles.

Figure 5C:
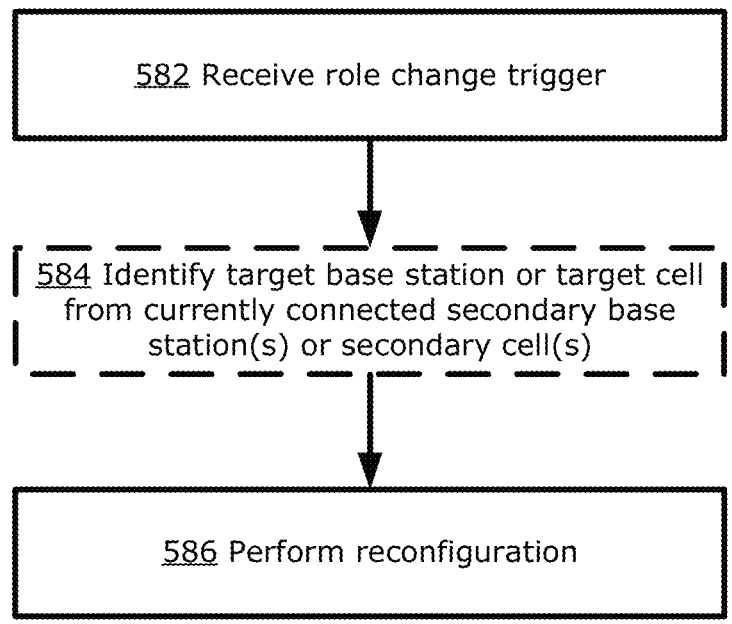
FIG. 5C is a flowchart illustrating another example method for role change using dynamic signaling, from the viewpoint of an ED.

FIG. 5C is a flowchart illustrating an example method 580 role change using dynamic signaling (e.g., using signaling as shown in FIG. 5B), from the viewpoint of the ED 110. In this example, dual connectivity may be used. At the start of the method 580, the ED 110 is initially connected to the first base station 170*a* as the source base station or the M-gNB (and connected to the primary cell of the first base station 170*a* as the PCell). The ED 110 initially is also connected to the second base station 170*b* as the S-gNB (and connected to the primary cell of the second base station 170*b* as the PSCell).

At 582, the ED receives a role change trigger, via dynamic signaling. The role change trigger may be a modified DCI signal, as discussed above. The role change trigger may be received from the first base station (the M-gNB), the second base station (the S-gNB) or both. The role change trigger may be a DCI signal with CRC bits scrambled by a specific RNTI, for example as discussed above, which the ED recognizes as indicating a role change. Other examples of dynamic signaling may be used as the role change trigger.

Optionally, at 584, the ED may identify the target S-gNB, target cell or target cell group for the role change. The target may be identified from among the secondary base station(s), secondary cell(s) or secondary cell group(s) the ED is currently connected to in the case of dual connectivity. For example, the ED may identify the target based on an indicator of the target included in the role change trigger. In some examples, 584 may not be required, such as where the ED automatically selects the first PSCell in the SCG with the lowest index as the target for the role change (in some examples, other selecting rule(s) may apply).

At 586, in response to receiving and recognizing the role change trigger (e.g., successful descrambling of the CRC bits using the unique RNTI) the ED reconfigures itself to use the second base station as the primary connection (e.g., by switching M-gNB and S-gNB or PCell and PSCell configuration information internally).

The ED is now connected to the second base station as the M-gNB. The ED may continue to be connected to the first base station as the S-gNB. The connection with the first base station may be released. In some examples, the ED may further transmit an acknowledgement of the role change to one or both of the base stations, before or after the ED performs reconfiguration at 586.

Figure 5D:
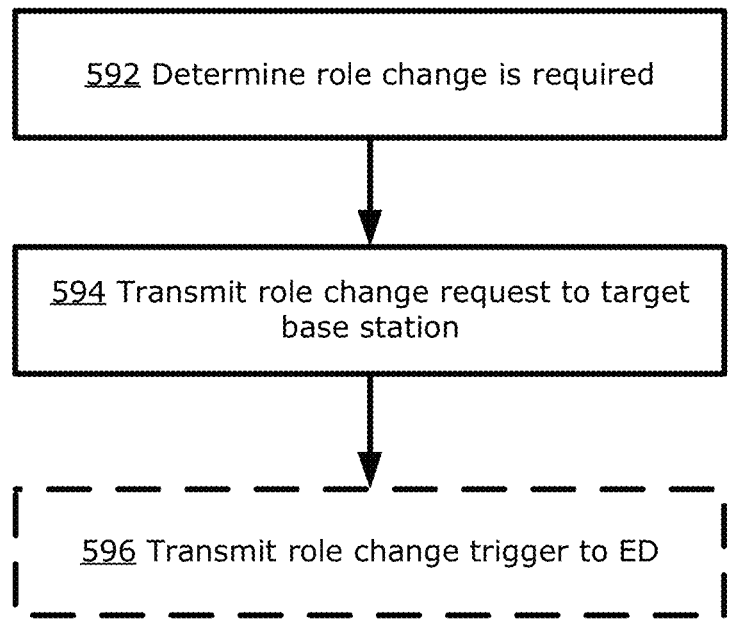
FIG. 5D is a flowchart illustrating an example method for role change using dynamic signaling, from the viewpoint of a base station.

FIG. 5D is a flowchart illustrating an example method 590 for role change using dynamic signaling (e.g., using signaling as shown in FIG. 5B), from the viewpoint of the base station that is initially the source base station or M-gNB (e.g., the first base station 170*a* in the example of FIG. 5B), or from the viewpoint of the base station that is the target base station or S-gNB (e.g., the second base station 170*b*).

At 592, the base station determines that a role change is required. For example, the base station may detect mobility of the ED indicating that the ED is moving towards the edge of the coverage area of the first base station. If the base station is the source base station or M-gNB, the base station may also identify a target base station (e.g., a S-gNB) for the role change. If the base station is the target base station or the S-gNB, the base station may automatically identify the source base station or the M-gNB for the role change.

At 594, the base station transmits a role change request to the other base station, via backhaul communication. Optionally, the base station may receive an acknowledgement or role change response from the other base station.

Optionally, at 596, the base station transmits a role change trigger to the ED, via dynamic signaling. The role change trigger may be a modified DCI signal, as discussed above. The role change trigger may be transmitted by the source base station (the M-gNB), the target base station (the S-gNB) or both. The role change trigger may be a DCI signal with CRC bits scrambled by a specific RNTI, for example as discussed above, which would be recognized by the ED as indicating a role change. Other examples of dynamic signaling may be used as the role change trigger. Optionally, the base station may receive an acknowledgement of the role change from the ED.

Figure 8A:
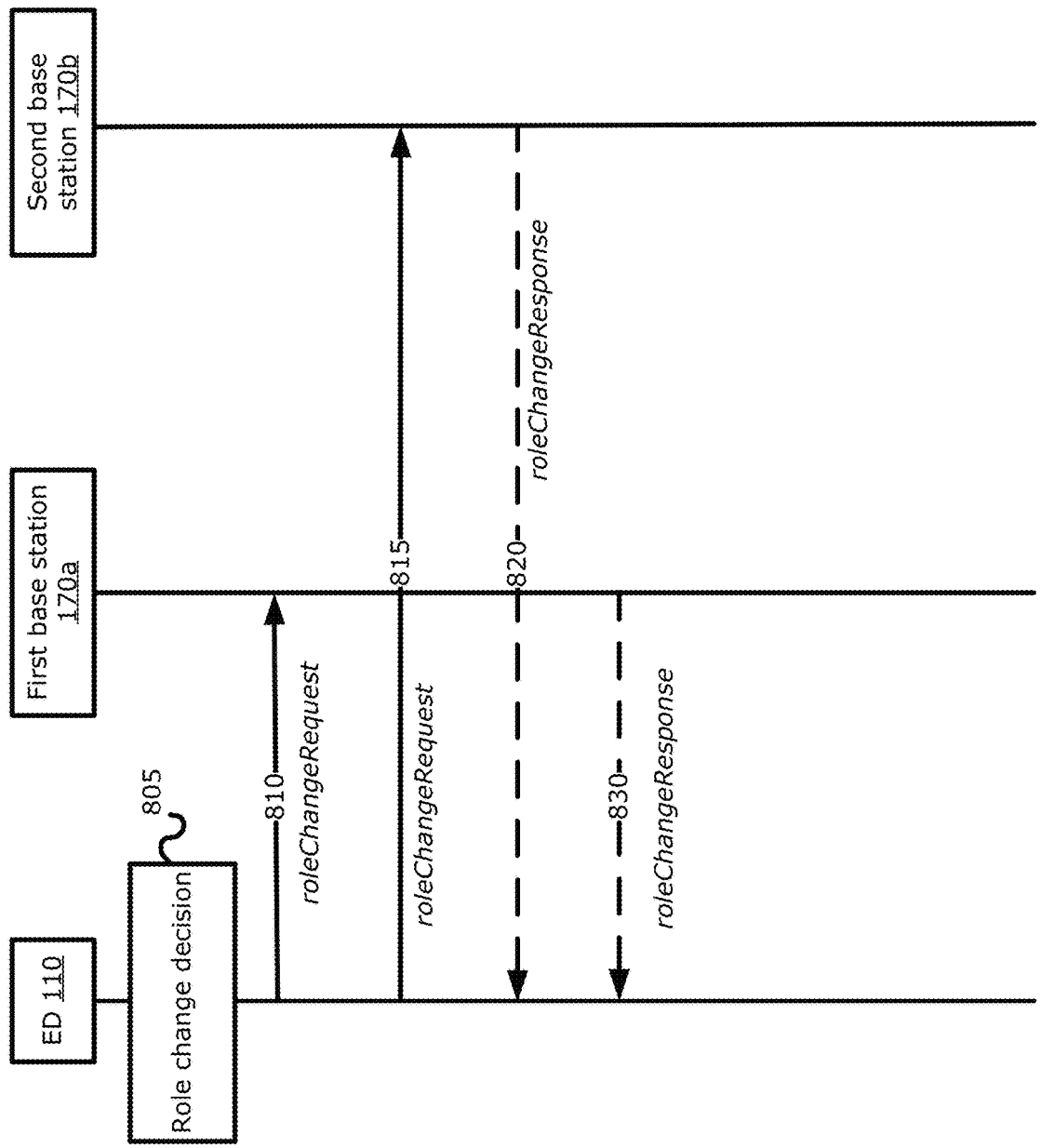
FIG. 8A is a signaling diagram illustrating another example method for role change using dynamic signaling, in accordance with example embodiments of the present disclosure.

FIG. 8A is a signaling diagram illustrating another example of the disclosed method for role change, in which dynamic signaling is used. The entities involved in the signaling in this example are the same as those of FIG. 5A, namely the ED 110, the first base station 170*a* (also referred to as the source gNB) and the second base station 170*b* (also referred to as the target gNB). Unlike the example of FIG. 5A, in the example of FIG. 8A the role change may be initiated by the ED 110. The example of FIG. 8A may be used where dual connectivity is being used, and the ED 110 has already established connections with both the first and second base stations 170*a*, 170*b*.

The ED 110 may, at 805, make a role change decision to initiate the role change between the first and second base stations 170*a*, 170*b*. For example, the ED 110 may detect its own mobility (e.g., using a global positioning system (GPS) sensor) and determine that its own mobility indicates a handover should occur. The ED 110 may also make the role change decision based on a detection of connection quality, for example the ED 110 may detect that the connection with the first base station 170*a* has dropped below a certain threshold, indicating that a handover should occur. The ED 110 may then initiate a role change.

The ED 110, at 810, communicates a request for role change (e.g., a roleChangeRequest message or a role change trigger) to the first base station 170*a*, using dynamic signaling. At 815, the ED 110 also communicates a request for role change (e.g., a roleChangeRequest message or a role change trigger) to the second base station 170*b*, using dynamic signaling. The communications at 810 and 815 may occur in any order, and may occur in parallel. The dynamic signaling at 810 and 815 may be transmission of an uplink signal (e.g., transmitting a UCI signal over PUCCH), uplink data (e.g., via PUSCH) or an SRS. The uplink transmission may be using an adapted format as discussed above.

The ED 110 may use different resources (e.g., as configured by RRC configurations) to transmit the role change request message to the first and second base stations 170*a*, 170*b*. The ED 110 may be configured to use a common resource for both first and second base stations 170*a*, 170*b*, and may send the role change request message using that common resource.

The role change request message from the ED 110 may trigger role change between M-gNB and S-gNB. In some examples, the role change request may identify the target cell or target cell group for the role change.

In some examples, the ED 110 may communicate the role change request to only one of the first base station 170*a* and the second base station 170*b*. The role change request from the ED 110 may further indicate that the role change request is only being sent to one base station. Whichever base station (e.g., first base station 170*a*) receives the role change request from the ED 110 may then communicate the role change request to the other base station (e.g., second base station 170*b*), for example using a backhaul link.

Optionally, at 820, the second base station 170*b* may transmit an acknowledgement (e.g., a roleChangeResponse message or an acknowledgement of receiving a role change trigger) to the ED 110, via dynamic signaling. The response message may be communicated using an adapted DCI format, as discussed above. In some examples, the ED 110 does not expect explicit acknowledgement from the second base station 170*b*, in which case step 820 may not be required.

Optionally, at 830, the first base station 170*a* may transmit an acknowledgement (e.g., a roleChangeResponse message or an acknowledgement of receiving a role change trigger) to the ED 110, via dynamic signaling. The response message may be communicated using an adapted DCI format, as discussed above. In some examples, the ED 110 does not expect explicit acknowledgement from the first base station 170*a*, in which case step 830 may not be required.

Where the ED 110 is configured to expect explicit acknowledgement from one or both of the first and second base stations 170*a*, 170*b*, the ED 110 may perform role change (e.g., switch M-gNB and S-gNB configuration information internally) after receiving the expected acknowledgement(s). In examples where no acknowledgement is expected, the ED 110 may perform role change at any time after transmitting the role change request messages at 810 and 815. For example, the ED 110 may perform role change after a preconfigured time or after expiration of a timer following 810 and 815.

In the example of FIG. 8A, there might be no communication of role change request or response between the base stations 170*a*, 170*b*, and downlink transmissions need not be used to trigger role change.

Figure 8B:
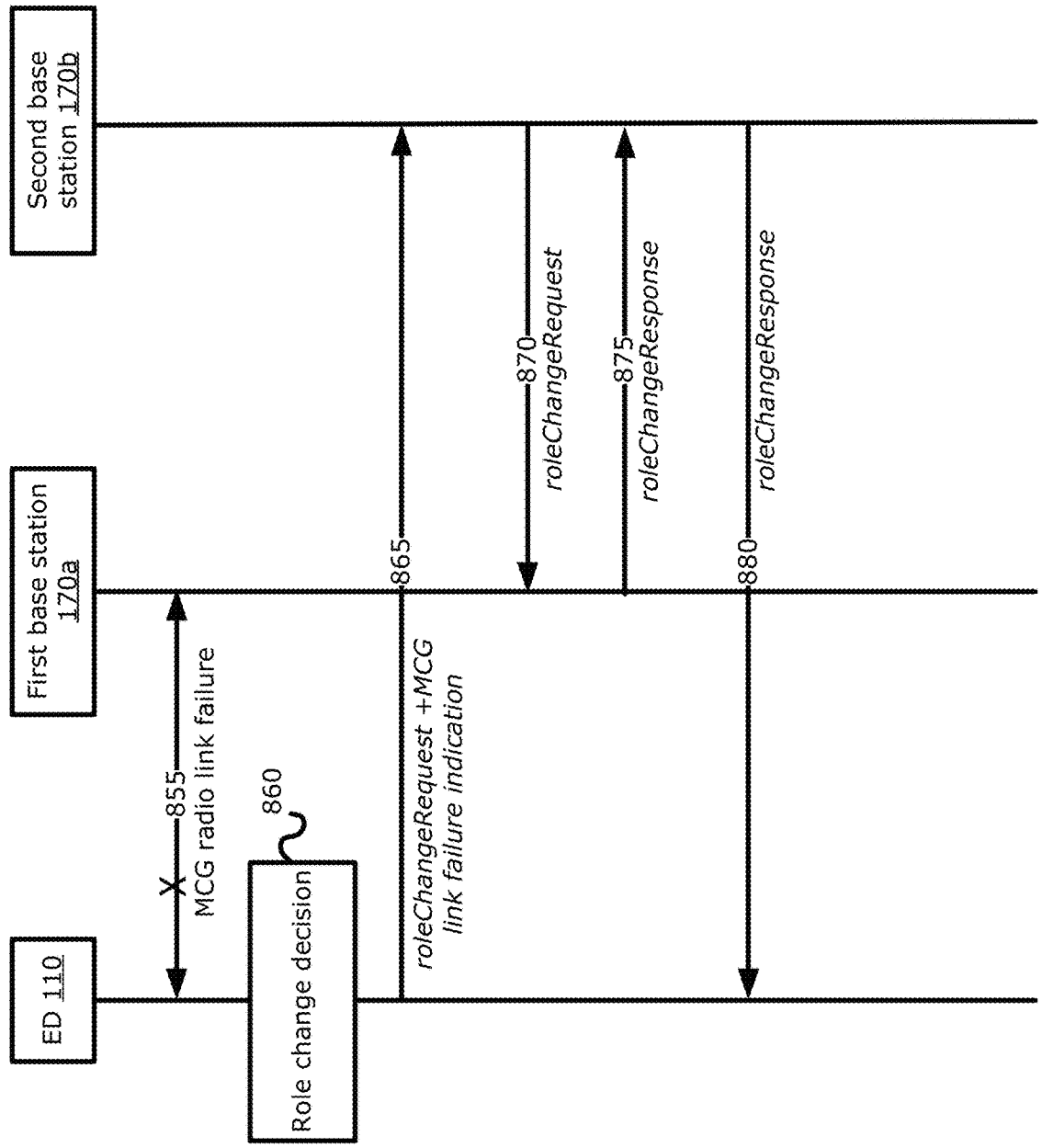
FIG. 8B is a signaling diagram illustrating another example method for role change using dynamic signaling, in accordance with example embodiments of the present disclosure.

FIG. 8B is a signaling diagram illustrating another example of the disclosed method for role change, in which dynamic signaling is used. Similar to the example of FIG. 8A, in the example of FIG. 8B the role change may be initiated by the ED 110, in this case due to failure of the primary connection with the first base station 170*a*.

In high frequency band wireless communications and/or with high speed mobility, the radio link stability may be lower, and hence the possibility of radio link degradation and/or link failure may be higher than with earlier generation wireless communications. When dual connectivity is in use, the ED 110 may be connected to the first base station 170*a* as the M-gNB, and connected to the second base station 170*b* as the S-gNB. The possibility that the connection between the ED 110 and the M-gNB will fail may be similar to the possibility that the connection between the ED 110 and the S-gNB will fail. In conventional radio link failure (RLF) connection re-establishment procedures, when dual connectivity is in use, if the ED 110 loses connectivity with the M-gNB and still has good connectivity with the S-gNB, the ED 110 declares a RLF and begins the RLF re-establishment procedure. However, this may increase the chance of service interruption, due to triggering of the radio link re-establishment procedure.

In an example of the disclosed method, when the ED 110 detects failure of the connection with the M-gNB, instead of declaring RLF, the ED 110 may instead use a role change procedure to use the still-connected S-gNB as the new M-gNB. This may help to avoid or mitigate service interruption.

At 855, the radio link between the ED 110 and the MCG of the first base station 170*a* fails (e.g., due to mobility, or signal degradation, among other possible causes). This failure may be detected by the ED 110. The ED 110 may further detect that the link with the SCG of the second base station 170*b* remains.

At 860, the ED 110 makes a role change decision to initiate the role change between the first and second base stations 170*a*, 170*b*. This decision may be in response to detection of the link failure at 855. This decision may be performed in place of declaring RLF and performing RLF re-establishment procedures. In some examples, making the role change decision may include the ED 110 making a determination whether the link with the second base station 170*b* is still connected and/or is of sufficient quality to replace the failed link with the first base station 170*a*. If the link with the second base station 170*b* has also failed, or is of insufficient quality, the ED 110 may instead declare RLF and initiate link re-establishment procedures.

After the ED 110 decides to initiate the role change, the ED 110, at 865, communicates a request for role change (e.g., a roleChangeRequest message or a role change trigger) to the second base station 170*b*, using dynamic signaling. The dynamic signaling at 865 may be transmission of an uplink signal (e.g., transmitting a UCI signal over PUCCH), uplink data (e.g., via PUSCH) or an SRS. The uplink transmission may be using an adapted format as discussed above. In some examples, the role change request may identify the target cell or target cell group for the role change.

The request for role change may also include an indication that the link with the first base station 170*a* has failed (e.g., a MCG link failure indication message). Including the indication of link failure may indicate to the second base station 170*b* that the ED 110 is not able to communicate the role change request to the first base station 170*a*, and thus cause the second base station 170*b* to communicate the role change request to the first base station 170*a* at 870. The communication of the role change request at 870 may be via a backhaul link between the first and second base stations 170*a*, 170*b*.

At 875, the first base station 170*a* transmits an acknowledgement (e.g., a roleChangeResponse message) to the second base station 170*b*, via a backhaul link.

At 880, the second base station 170b transmits the acknowledgement (e.g., the roleChangeResponse message) to the ED 110, via dynamic signaling. The response message may be communicated using an adapted DCI format or using PDSCH, as discussed above. Then, the ED 110 may perform role change (e.g., switch S-gNB to M-gNB in its internal configuration information) after receiving the expected acknowledgement. The ED 110 and the first base station 170a may further release any remaining connection with each other.

The ED 110 may be configured to expect explicit acknowledgement (e.g., the roleChangeResponse message or an acknowledgement of receiving the role change trigger) from the second base station 170b, and the ED 110 may perform role change (e.g., switch S-gNB to M-gNB in its internal configuration information) after receiving the expected acknowledgement. The ED 110 and first base station 170a may further release any remaining connection with each other.

In some examples, the ED 110 does not expect explicit acknowledgement from the second base station 170b. In such cases, either or both of steps 875 and 880 may not be required. Where no acknowledgement is expected, the ED 110 may perform role change at any time after transmitting the the role change request message at 865. For example, the ED 110 may perform role change after a preconfigured time or after expiration of a timer following 865.

In the example of FIG. 8B, ED-initiated role change may be used to avoid performing the conventional RLF procedure. ED-initiated role change may be used in other situations, for example as described above with respect to FIG. 8A.

Figure 9A:
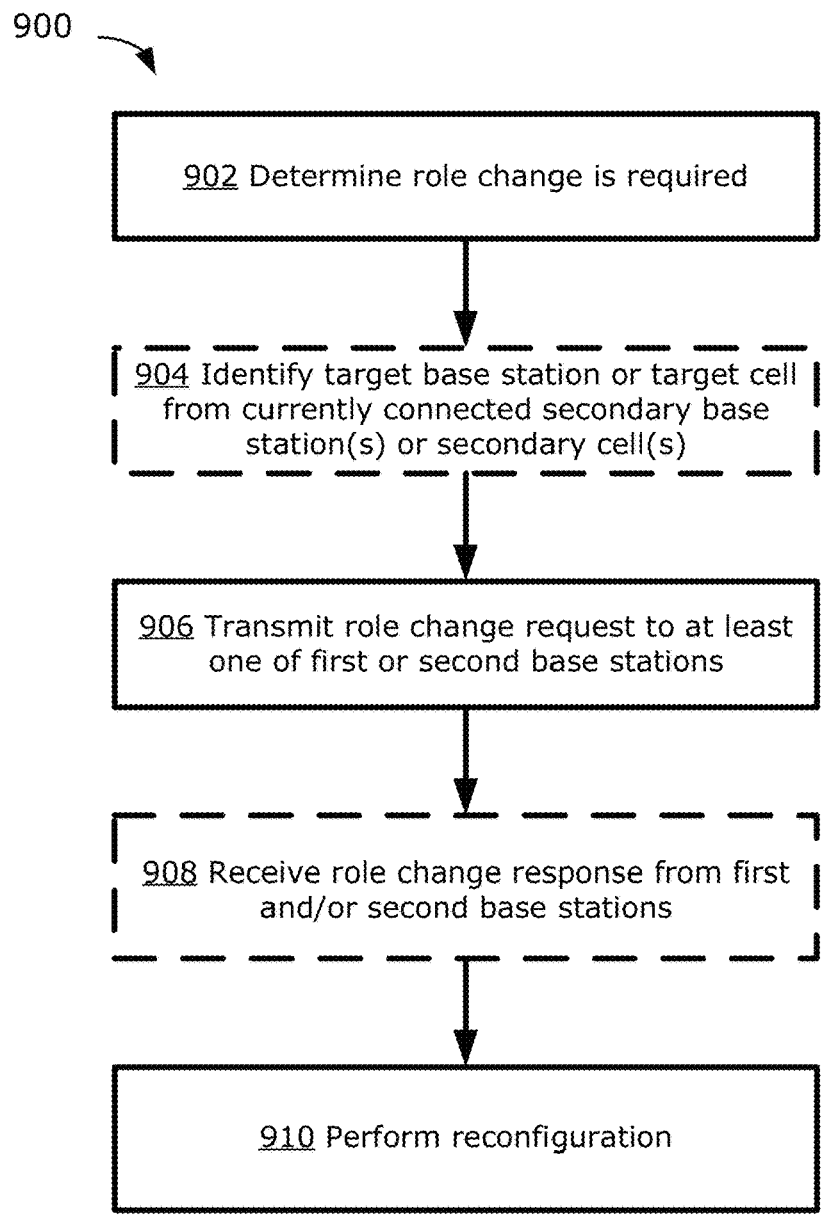
FIG. 9A is a flowchart illustrating an example method for role change using dynamic signaling, from the viewpoint of a ED.

FIG. 9A is a flowchart illustrating an example method 900 for ED-initiated role change using dynamic signaling (e.g., using signaling as shown in FIG. 8A or FIG. 8B), from the viewpoint of the ED 110. In this example, dual connectivity is used. At the start of the method 900, the ED 110 is initially connected to the first base station 170a as the source base station or the M-gNB (and connected to the primary cell of the first base station 170a as the PCell). The ED 110 initially is also connected to the second base station 170b as the S-gNB (and connected to the primary cell of the second base station 170b as the PSCell).

At 902, the ED determines that a role change is required. For example, the ED may detect its own mobility (e.g., leaving coverage area of the first base station 170a) and determine that a role change should be performed. In another example, the ED may detect link failure and/or link degradation with the first base station 170a and determine that a role change should be performed.

Optionally, at 904, the ED may identify the target S-gNB, target cell or target cell group for the role change, from among the secondary base station(s), secondary cell(s) or secondary cell group(s) the ED is currently connected to. For example, the ED may select the target based on detected quality of connection, or based on current or expected future mobility of the ED. In some examples, 904 may not be required, such as where the ED automatically selects the first PSCell in the SCG with the lowest index as the target for the role change.

At 906, the ED transmits a role change request, via dynamic signaling, to at least one of the first and second base stations (i.e., the source and target base stations, respectively). For example, in the case where the link with the first base station has failed, the ED may transmit the role change request only to the second base station. Where the ED transmits the role change request only to one base station, the role change request may also include an indication (e.g., MCG link failure indication) to cause the receiving base station to communicate a role change request to the other base station (e.g., via backhaul link). The ED may transmit the role change request uplink, using an uplink signal (e.g., transmitting a UCI signal over PUCCH), uplink data (e.g., via PUSCH) or an SRS. The uplink transmission may be using an adapted format as discussed above.

Optionally, at 908, the ED may receive a role change response (or other acknowledgement) from one or both of the first and second base stations, via dynamic signaling. The role change response may be sent over a downlink channel, such as downlink data over PDSCH or a DCI signal over PDCCH, for example. For example, the role change response may use an adapted DCI format as discussed above.

At 910, the ED reconfigures itself to use the second base station as the primary connection (e.g., by switching M-gNB and S-gNB or PCell and PSCell configuration information internally). In some examples, 910 may be performed any time after 906 (e.g., after a preconfigured time or expiration of a timer following 906), without the ED having to receive acknowledgement from one or both base stations.

The ED is now connected to the second base station as the M-gNB. The ED may continue to be connected to the first base station as the S-gNB, if the connection with the first base station has not failed. The connection with the first base station may be released.

Figure 9B:
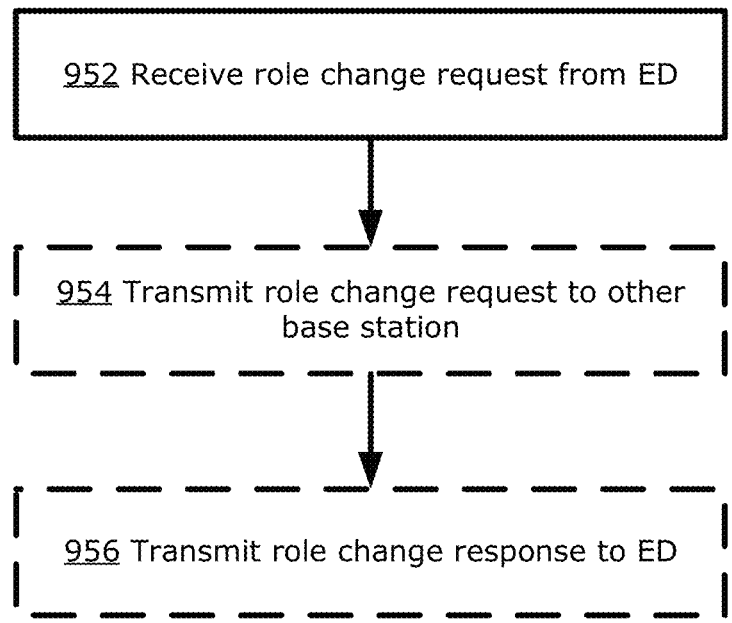
FIG. 9B is a flowchart illustrating an example method for role change using dynamic signaling, from the viewpoint of a base station.

FIG. 9B is a flowchart illustrating an example method 950 for ED-initiated role change using dynamic signaling (e.g., using signaling as shown in FIG. 8A), from the viewpoint of the first or second base station (initially the M-gNB or S-gNB, respectively).

At 952, the base station receives a role change request from the ED, via dynamic signaling. For example, the role change request may be a UCI signal received over PUCCH, uplink data received over PUSCH, or a SRS signal, for example using adapted formats, as discussed above.

Optionally, at 954, the base station transmits a role change request to the other base station, for example via a backhaul link. 954 may be performed where the role change request received from the ED includes an indication (e.g., MCG link failure indication) that the role change request was not sent to both the first and second base stations.

Optionally, at 956, the base station transmits a role change response (or other acknowledgement) to the ED, via dynamic signaling (e.g., using a DCI signal). Where the base station communicated the role change request to the other base station at 954, 956 may be performed after receiving an acknowledgement (e.g., a role change response message) from the other base station, for example via a backhaul link.

It should be appreciated that various examples described herein may be performed by corresponding units or modules, of the ED and/or the base stations, and may be implemented using software, hardware, or a combination of software and hardware.

Figure 10A:
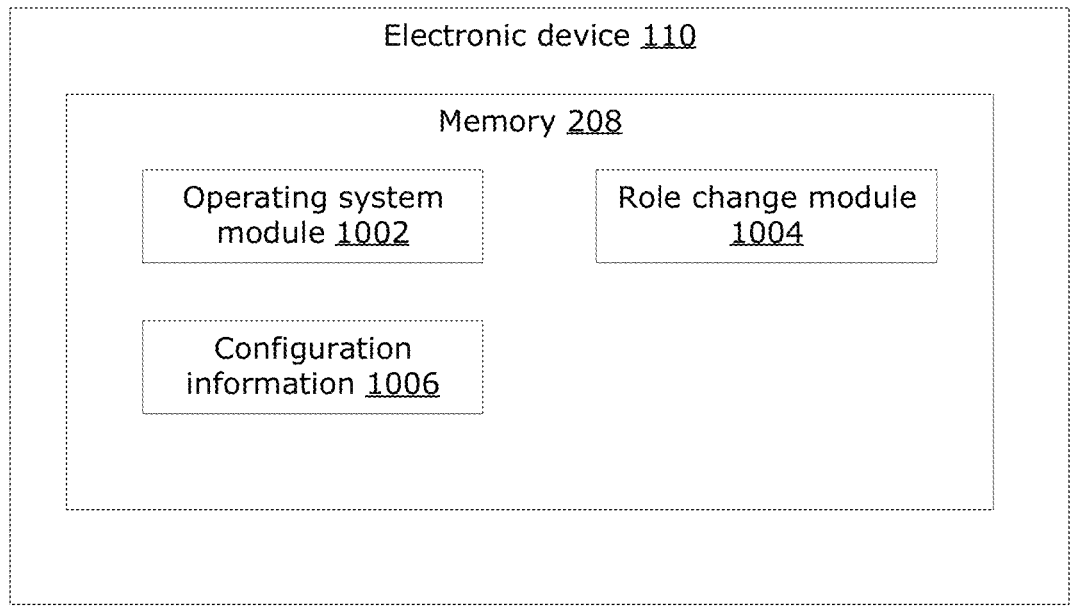
FIGS. 10A and 10B are a block diagrams of example modules that may be implemented in electronic devices in accordance with examples embodiments of the present disclosure.

FIG. 10A illustrates example modules of an example ED 110 that may be used to perform examples described herein (e.g., to perform the steps of the method 700 or the method 900). The example ED 110 shown in FIG. 10A has been simplified from the example of FIG. 2A to illustrate details of the memory 208. In this example, the memory 208 includes modules, which may be executed by a processing unit of the ED 110, to perform example embodiments of the present disclosure and other functions of the ED 110. In this example, the memory 208 includes an operating system module 1002 to enable the ED 110 to implement an operating system. The memory 208 also includes a role change module 1004 which may contain instructions that, when executed by the processing unit, causes the ED 110 to perform methods described herein. The memory 208 may also contain data, such as configuration information 1006, which may be used by the ED 110 to establish a connection with a base station 170. In some examples, the configuration information 1006 may be provided by the base station 170. The configuration information 1006 may, in the case where dual connectivity is used, including configuration information for a M-gNB and one or more S-gNBs and/or configuration information for a PCell and one or more PSCells. The configuration information 1006 may be switched between the M-gNB and a S-gNB or between the PCell and a PScell, as part of the role change, as discussed above.

Figure 10B:
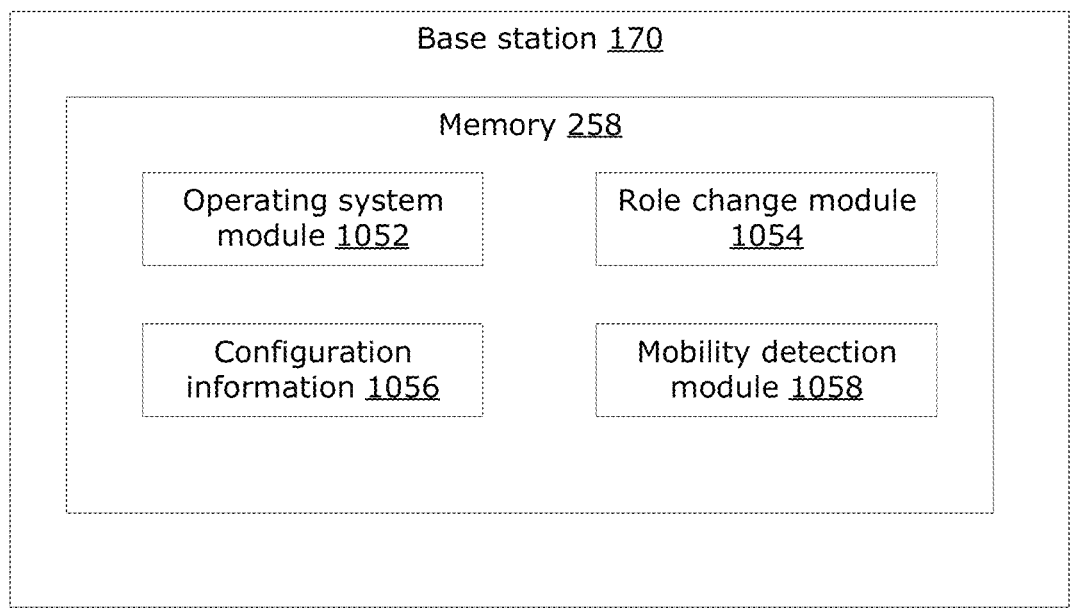

FIG. 10B illustrates example modules of an example base station 170 that may be used to perform examples described herein (e.g., to perform the steps of the method 730, the method 760 or the method 950). The example base station 170 shown in FIG. 10B has been simplified from the example of FIG. 2B to illustrate details of the memory 258. In this example, the memory 258 includes modules, which may be executed by a processing unit of the base station 170, to perform example embodiments of the present disclosure and other functions of the base station 170. The base station 170 in FIG. 10B may generally be the first base station or the second base station discussed above. In this example, the memory 258 includes an operating system module 1052 to enable the base station 170 to implement an operating system. The memory 258 also includes a role change module 1054 which may contain instructions that, when executed by the processing unit, causes the base station 170 to perform methods described herein. The memory 258 may also contain data, such as configuration information 1056, which may be transmitted to an ED 110 to enable a connection with the base station 170. The memory 258 may also include a mobility detection module 1058, which may enable the base station 170 to detect mobility of a connected ED 110. The mobility detection module 1058 may, together with the role change module 1054 for example, determine when a role change should be triggered, such as when the ED 110 is detected to be moving towards the edge of the coverage area of the base station 170.

In various examples described herein, dynamic signaling is used, instead of backhaul or higher-layer signaling, for performing a role change between a M-gNB and S-gNB (or between PCell and PSCell), for example for a handover procedure. Examples of the present disclosure may enable reduced latency (e.g., 1 ms or less) and/or reduced signaling overhead in the role change procedure, compared to conventional techniques.

Examples of the present disclosure also provide various UCI, DCI and SRS designs that may be used to perform the dynamic signaling.

In some aspects, the present disclosure describes a base station that includes: a processing unit configured to execute instructions to cause the base station to: determine a role change is required; transmit a role change request to an electronic device (ED) connected to the base station, via dynamic signaling; and receive a role change response from the ED, via dynamic signaling.

In some aspects, the present disclosure describes a method at a base station. The method includes: determining a role change is required; and transmitting a role change trigger to an electronic device (ED) connected to a serving cell of the base station, via dynamic signaling.

In some examples of the method at the base station, the method may further include receiving a role change response from the ED, via dynamic signaling.

In some aspects, the present disclosure describes an electronic device (ED). The ED includes a processing unit configured to execute instructions to cause the ED to: determine a role change is required between a first serving cell, with which the ED initially has a primary connection, and a second serving cell, with which the ED initially has a secondary connection; transmit a role change request to at least one of the first serving cell and the second serving cell, via dynamic signaling; and reconfigure connection information at the ED to use a connection with the second serving cell, instead of the first serving cell, as the primary connection.

In some examples of the ED, the role change request may be transmitted as an uplink control information (UCI) signal, uplink data, or a sounding reference signal (SRS).

In some examples of the ED, the instructions may further cause the ED to: receive, from at least one of the first and second serving cells, an acknowledgement, via dynamic signaling.

In some examples of the ED, determining the role change is required may include determining that the primary connection with the first serving cell has failed.

In some examples of the ED, the role change request may be transmitted to only one of the first serving cell or the second serving cell, and the role change request may include an indicator to cause the one of the first serving cell or the second serving cell to relay the role change request to the other of the first serving cell or the second serving cell.

In some aspects, the present disclosure describes a method at an electronic device (ED). The method includes: determining a role change is required between a first serving cell, with which the ED initially has a primary connection, and a second serving cell, with which the ED initially has a secondary connection; transmitting a role change request to at least one of the first serving cell and the second serving cell, via dynamic signaling; and reconfiguring connection information at the ED to use a connection with the second serving cell, instead of the first serving cell, as the primary connection.

In some aspects, the present disclosure describes a base station that includes: a processing unit configured to execute instructions to cause the base station to: receive a role change request from an electronic device (ED), via dynamic signaling; and transmit a role change response to the ED, via dynamic signaling.

In some aspects, the present disclosure describes a method at a base station. The method includes: receiving a role change request from an electronic device (ED), via dynamic signaling; and transmitting a role change response to the ED, via dynamic signaling.

In some aspects, the present disclosure describes a base station. The base station includes a processing unit configured to execute instructions to cause the base station to: receive, from an electronic device (ED) connected to a serving cell of the base station, a role change request, via dynamic signaling; and transmit an acknowledgement to the ED, via dynamic signaling.

In some examples of the base station, the instructions may further cause the base station to: relay the role change request to another base station, the other base station being a target of the role change.

In some examples of the base station, the role change request may be received as an uplink control information (UCI) signal, as uplink data, or as a sounding reference signal (SRS).

In some aspects, the present disclosure describes a method at a base station. The method includes: receiving, from an electronic device (ED) connected to a serving cell of the base station, a role change request, via dynamic signaling; and transmitting an acknowledgement to the ED, via dynamic signaling.

In some aspects, the present disclosure describes an electronic device (ED). The ED includes a processing unit configured to execute instructions to cause the ED to: receive a role change request from a first serving cell, via dynamic signaling; and reconfigure connection information at the ED to use a connection with a second serving cell, instead of the first base station, as a primary connection.

In some examples of the ED, the instructions may further cause the ED to forward the role change request to the second serving cell, via dynamic signaling.

In some aspects, the present disclosure describes a method at an electronic device (ED). The method includes: receiving a role change request from a first serving cell, via dynamic signaling; and reconfiguring connection information at the ED to use a connection with a second serving cell, instead of the first base station, as a primary connection.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a computer program product or software product. A suitable software product may be stored in a pre-recorded storage device or other similar non-volatile or non-transitory computer readable medium, including DVDs, CD-ROMs, USB flash disk, a removable hard disk, or other storage media, for example. In some examples, the software product is downloadable from a server and can be installed on a processing system, such as processing system 200. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An electronic device (ED) comprising:
a processor configured to execute instructions to cause the ED to:
receive, via dynamic signaling, from a first serving cell, with which the ED initially has a primary connection, a role change trigger in a downlink control information (DCI) signal, the DCI signal including at least two fields containing all '0' or all '1', the at least two fields being at least two of: a hybrid automatic repeat request (HARQ) process field, a modulation and coding scheme (MCS) field, a new data indicator (NDI) field, or a redundancy version field;
wherein the at least two fields containing all '0' or all '1' are recognized as indicating the role change trigger; and
wherein the role change trigger causes the ED to use a connection with a second serving cell, with which the ED initially has a secondary connection, as the primary connection instead of the first serving cell.

2. The ED of claim 1, wherein the instructions further cause the ED to:
transmit, to at least one of the first serving cell and the second serving cell, an acknowledgement of the role change trigger, via dynamic signaling.

3. The ED of claim 1, wherein the ED is in connection with the first serving cell and also is in connection with the second serving cell, wherein the first serving cell is a cell of a master cell group for the ED and the second serving cell is a cell of a secondary cell group for the ED, and wherein the instructions further cause the ED to reconfigure connection information by switching configuration information between the cell of the master cell group and the cell of the secondary cell group.

4. The ED of claim 1, wherein the DCI signal includes at least one field having no predetermined value, the at least one field being at least one of: a transmit power control (TPC) field, a physical uplink control channel (PUCCH) resource field, or a hybrid automatic repeat request (HARQ) timing field.

5. The ED of claim 4, wherein the at least one field having no predetermined value contains information useable by the ED to provide feedback.

6. The ED of claim 1, wherein cyclic redundancy check (CRC) bits of the DCI signal have been scrambled using a specific identifier.

7. The ED of claim 6, wherein the specific identifier is a specific radio network temporary identifier (RNTI).

8. The ED of claim 1, wherein the role change trigger includes information identifying the second serving cell as a target for the role change.

9. The ED of claim 1, wherein the instructions further cause the ED to:
receive configuration information from the second serving cell; and
reconfigure connection information using the received configuration information.

10. A base station comprising:
a configured to execute instructions to cause the base station to:
determine a role change is required; and transmit a role change trigger to an electronic device (ED) connected to a serving cell of the base station, via dynamic signaling, the role change trigger being transmitted in a downlink control information (DCI) signal, the DCI signal including at least two fields containing all '0' or all '1', the at least two fields being at least two of: a hybrid automatic repeat request (HARQ) process field, a modulation and coding scheme (MCS) field, a new data indicator (NDI) field, or a redundancy version field;

wherein the at least two fields containing all '0' or all '1' indicate the role change trigger.

11. The base station of claim 10, wherein the instructions further cause the base station to:
receive an acknowledgement of the role change trigger from the ED, via dynamic signaling.

12. The base station of claim 10, wherein the instructions further cause the base station to, prior to transmitting the role change trigger:
transmit a role change request to a serving cell of a second base station that is a target of the role change; and
receive a role change response from the second base station.

13. The base station of claim 10, wherein the serving cell of the base station is initially in the role of a cell of a master cell group.

14. The base station of claim 10, wherein the role change trigger includes information identifying a serving cell of a second base station as a target for the role change.

15. The base station of claim 10, wherein the DCI signal includes at least one field having no predetermined value, the at least one field being at least one of: a transmit power control (TPC) field, a physical uplink control channel (PUCCH) resource field, or a hybrid automatic repeat request (HARQ) timing field; and
wherein the at least one field having no predetermined value contains a bit value for indicating a target of the role change.

16. The base station of claim 10, wherein cyclic redundancy check (CRC) bits of the DCI signal have been scrambled using a specific radio network temporary identifier (RNTI).

17. The base station of claim 10, wherein the role change trigger is transmitted to a group of EDs.

18. A method at an electronic device (ED), the method comprising:
receiving, via dynamic signaling, from a first serving cell, with which the ED initially has a primary connection, a role change trigger in a downlink control information (DCI) signal, the DCI signal including at least two fields containing all '0' or all '1', the at least two fields being at least two of: a hybrid automatic repeat request (HARQ) process field, a modulation and coding scheme (MCS) field, a new data indicator (NDI) field, or a redundancy version field;
wherein the at least two fields containing all '0' or all '1' are recognized as indicating the role change trigger; and
wherein the role change trigger causes the ED to use a connection with a second serving cell, with which the ED initially has a secondary connection, as the primary connection instead of the first serving cell.

19. The method of claim 18, further comprising:
transmitting, to at least one of the first serving cell and the second serving cell, an acknowledgement of the role change trigger, via dynamic signaling.

* * * * *

UNITED STATES PATENT AND TRADEMARK OFFICE
CERTIFICATE OF CORRECTION

PATENT NO. : 10,939,340 B2
APPLICATION NO. : 16/532991
DATED : March 2, 2021
INVENTOR(S) : Yongxia Lyu et al.

Page 1 of 1

It is certified that error appears in the above-identified patent and that said Letters Patent is hereby corrected as shown below:

In the Claims

In Column 34, Line 65 (Claim 10): "a configured to execute" should read --a processor configured to execute--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*